INVENTORS.
JOHN T. LYNCH
WALTER C. FRESCH
BLAIR C. THOMPSON
RICHARD E. BRADLEY

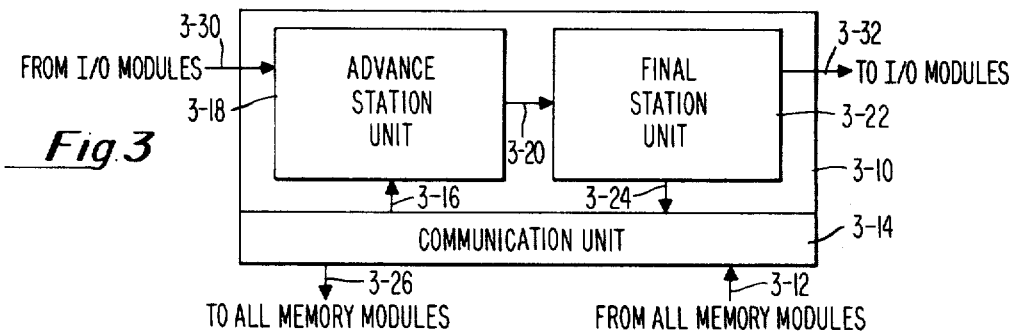
Fig. 3 — UNITS OF EACH COMPUTER MODULE
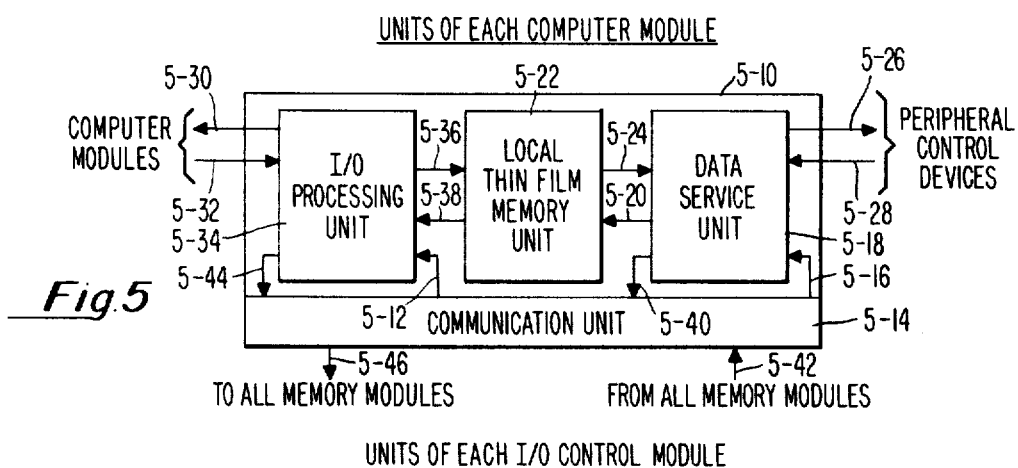
Fig. 5 — UNITS OF EACH I/O CONTROL MODULE
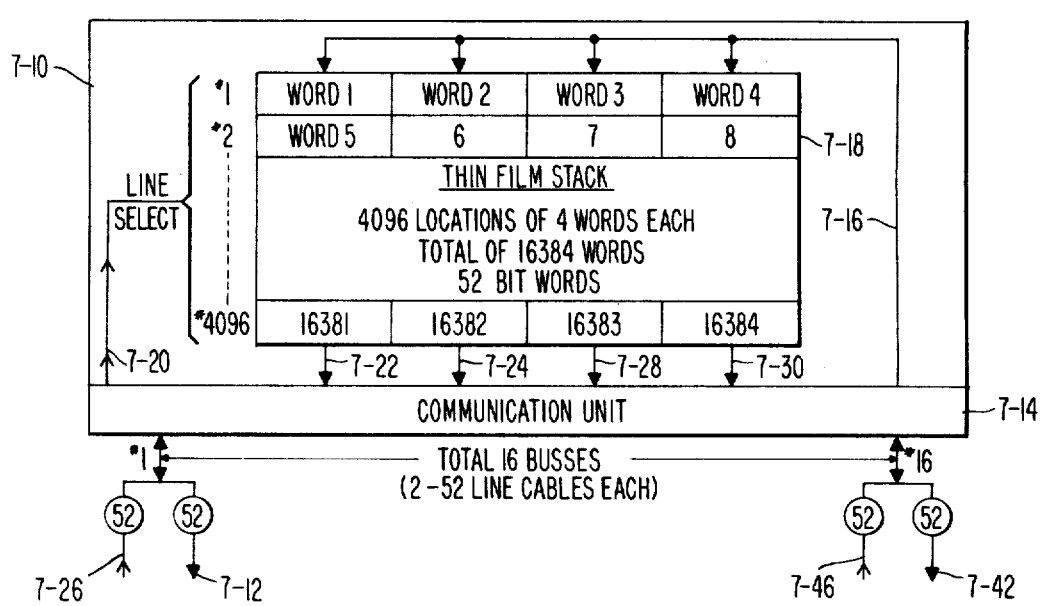
Fig. 7 — UNITS OF EACH MAIN MEMORY MODULE

United States Patent Office

3,411,139
Patented Nov. 12, 1968

3,411,139
MODULAR MULTI-COMPUTING DATA PROCESSING SYSTEM
John T. Lynch, Lionville, Walter C. Fresch, Phoenixville, Blair C. Thompson, King of Prussia, and Richard E. Bradley, Wayne, Pa., assignors to Burroughs Corporation, Detroit, Mich., a corporation of Michigan
Filed Nov. 26, 1965, Ser. No. 509,719
24 Claims. (Cl. 340—172.5)

ABSTRACT OF THE DISCLOSURE

A modular data processing system is disclosed which is capable of concurrently computing sequential segments of a single program while simultaneously performing parallel processing upon a plurality of programs. The system includes functional modules each of which have been compartmentalized into a plurality of separate units, each unit, in turn, is capable of substantially independent operation. Further, the thin film memory modules used in main memory are plural word/line organized to permit multi-word readout for an individual access time. Also included is a plurality of modularly structured control programs to provide a data processing system with both modular hardware and software to enable parallel processing at many new levels.

---

This invention relates to modular data processing systems having multicomputing or parallel processing capabilities. In particular, it relates to such a system in which parallel processing occurs at many intervals to provide a highly proficient parallel processing system. The insatiable demand for higher operating speeds in data processing systems has resulted in two unmistakable trends in system design. They are modularity and multicomputing (parallel processing). While both achieve similar results, and in fact, are related, the ability of a system to process in parallel is readily seen to be quite a different characteristic than modularity. Consideration of the respective definitions makes this difference even more apparent.

In the case of modularity, few authorities will argue that a system may be defined as modular if it comprises a plurality of functional modules, each capable of performing a particular system function. On the other hand, considerable controversy exists regarding a specific definition of a parallel processing system.

However, it is generally agreed that, to be a parallel processor, a system must have two or more arithmetic control units capable of simultaneously executing two or more programs, have all of its major elements in use during normal operations, and include interconnection means between these major elements to provide memory to memory type communications at memory access speeds.

Most previous modular systems which also satisfied this definition of multiprocessing included a plurality of similar modules in each of the functional areas of the system. Thus each of a plurality of processing modules simultaneously communicated with a separate memory module of the plurality of memory modules which form the main memory to concurrently execute separate programs.

It is apparent from this that while there are previously known systems which have combined the features of modularity with the capability of parallel processing these previous efforts have produced systems which possessed the obvious advantages of each. The present system possesses all of these features. However, by the incorporation of a number of novel concepts, which can best be considered as departures from the path of normal improvement, the present invention provides a data processing system which has advanced the state of system design art to an unexpected degree.

Simply stated, it has accomplished this by combining the aforementioned trends in such a way as to achieve substantially more than the advantages of each. First, in this configuration, the concept of modularity is no longer limited to the machine structure, but has been extended to the operating structure.

In this way, all of the advantages of modularity, namely, reliability, availability, concurrency, etc., are present throughout the system.

Further, the concept of parallelism previously limited to the number of functional modules degree of modularity has been extended beyond this barrier.

For example, where previously the maximum number of concurrent computations was determined by the number of computer modules parallel processing particular programs, the maximum is now determined by the number of computer modules times the number of concurrent computations occuring within each computer module. More simply, if each of five computer modules is divided into three separate units, each capable of substantially independent processing, the maximum number of concurrent computations possible is increased from five to fifteen.

Moreover, the interweaving of the concepts of modularity and concurrency has produced additional results which are not immediately apparent. That is, not only has the extension of each into the other provided each with the advantages of the other but in certain cases, the combination has provided new advantages of its own.

For instance, the introduction of the modular concept into the area of software (operating programs), has not only provided an operating control system which processes the aforementioned advantages of modularity, but it has provided an operating control system which is far less complex than would be expected for a multiprocessing system. In fact, it is a common belief in the computer art that the control program required for a multiprocessing system would be so complex as to make such a system infeasible. The simplicity of the executive program required by the present multiprocessing system is considered ample proof of the mythical nature of this belief.

It is therefore an object of the present invention to provide a data processing system having a high degree of modularity which is capable of concurrent computation at many processing levels.

It is a further object of the present invention to extend the concept of structural modularity previously limited to the hardware of the system to the software, "software" being a well-known term in the processing art to generally denote the operating system of programs housed in the memory.

It is also an object of the present invention to provide a multicomputing data processing system having a straight forward and simple overall operating system to thereby conclusively disprove the commonly held myth that the operating system for such a processor must be so overwhelmingly complex as to make it infeasible.

It is a still further object of the present invention to provide a data processing system having a plurality of functional module types, a plurality of modules of each type interconnected for simultaneous operation including a plurality of units in each module capable of substantially independent processing to thereby provide concurrent computation capability within each of said modules and by each of said modules within the system.

It is also an object of this invention to provide a truly modular multiprocessing system having a plurality of identical memory modules each of which is capable of interchangeably servicing any one of a plurality of functionally mixed modules.

Other objects and features of the present invention will become apparent upon a careful consideration of the following detailed description when taken together with the accompanying drawings.

In the drawings:

FIGURE 3 is a simplified block diagram of the computer module used in the present system showing its separate processing units;

FIGURE 5 is a simplified block diagram of the Input/Output Control Module showing its separate processing units;

FIGURE 7 is the simplified diagram of the memory module showing its units;

Before going into the detailed description of these drawings, it is deemed appropriate to mention that the illustrations and description of this application are directed toward the system concepts believed novel, and so claimed, which relate to the overall processing system.

Considerably more structural and descriptive details of two of the three functional modules illustrated in the above figures and described in the following portion of this specification are considered to include features which are, themselves, separate inventions. Consequently, these modules are disclosed in separate patent applications which specifically describe and illustrate their distinctive features. Both applications are assigned to the present assignee.

The two applications are: (1) Central Processor, by George H. Barnes et al., Serial No. 509,908, filed November 26, 1965, and (2) Modular Input/Output Data Service Computer by Richard E. Bradley et al., Serial No. 509,909, filed November 26, 1965.

The contents of both of these copending applications are incorporated into this specification by this reference.

Individually they completely disclose their respectively claimed inventions, while collectively they comprehensively divulge the details of the complete data processing system.

The remaining functional module, namely, the Memory Module, has been illustrated in greater detail in the above drawings and will be correspondingly described in the following material.

Figure 1:
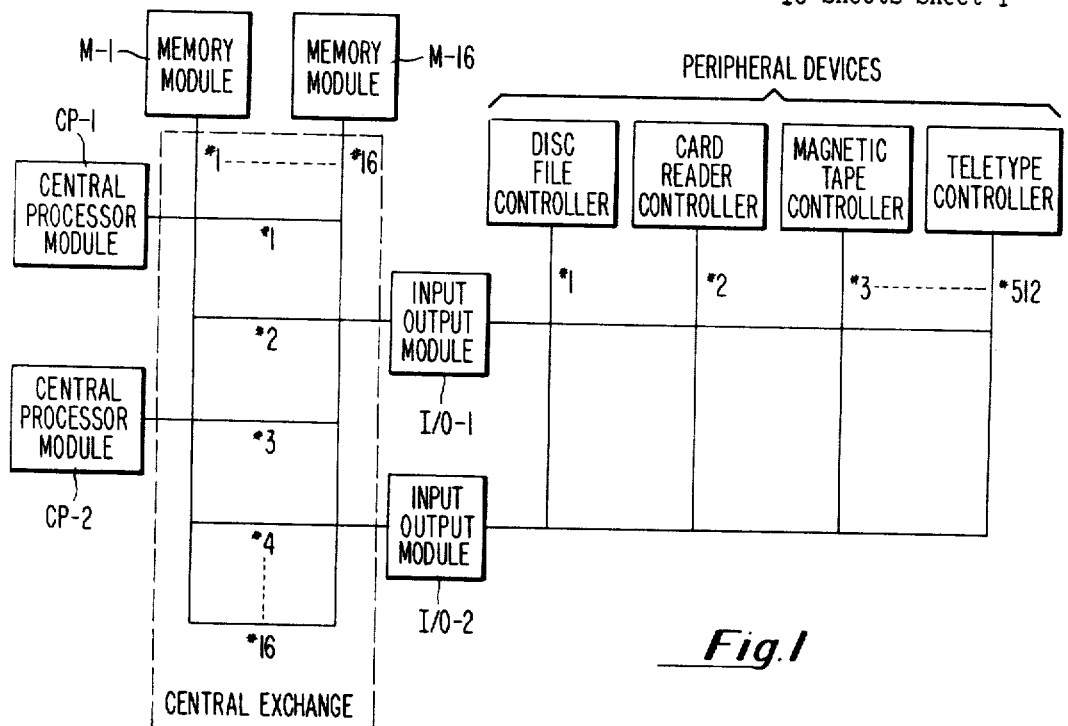
FIGURE 1 is a modular block diagram of a typical system configuration.

Referring in particular to FIGURE 1, there is shown a basic configuration of the invention. In the upper left portion of the figure, a group of identical memory modules, represented in abbreviated form as M1–M6, house the magnetic thin film main memory of the system. The storage capacity of the main memory may be as small as one module or as large as sixteen to provide not only present flexibility but future expandability. Each Memory Module is basically a high speed storage medium whose primary function is to perform read/write data handling under the control of commands from a second group of modules which comprise the processing and control portion of the system. The two module groups are interconnected through a matrix cabling exchange, referred to as the central exchange. This second group of modules includes the Central Processing Modules CP–1 and CP–2 shown in a vertical line down the left side of the figure, and the I/O Control Modules I/O–1 and I/O–2, shown connected to alternate busses of the central exchange. The number of modules in the second group is also flexible and may include from one of each type up to a total of sixteen, in any mixture.

A maximum system, exclusive of its peripheral equipment, therefore would include 32 modules, 16 of which would house the main memory portion and 16, the processing and control portion.

Since there can be included in the present system a maximum number of modules in the processing and control portion (16) equal to the maximum number of modules in the main memory (16), it is ideally possible that all 16 Memory Modules could be concurrently communicating with a separate I/O Control or Central Processing Module to provide a total of sixteen separate, simultaneous, processing operations.

Returning to FIGURE 1, on the right hand side there is shown connected to the opposite side of each of the I/O Control Modules I/O–1 and I/O–2 a plurality of Peripheral Device Controllers. As many as 512 such controllers may be simultaneously controlled by each I/O Control Module. This interconnection also has considerable flexibility and may be accomplished in a number of ways. For example, all I/O modules may share the same 512 controllers, as is shown in the FIGURE 1. But since each I/O Module can accommodate 512 controllers there could be as many separate groups of 512 controllers as there are I/O Control Modules. A detailed explanation of this interconnection as well as these controllers is included in the previously mentioned copending application on the input/output portion of the system.

Figure 2:
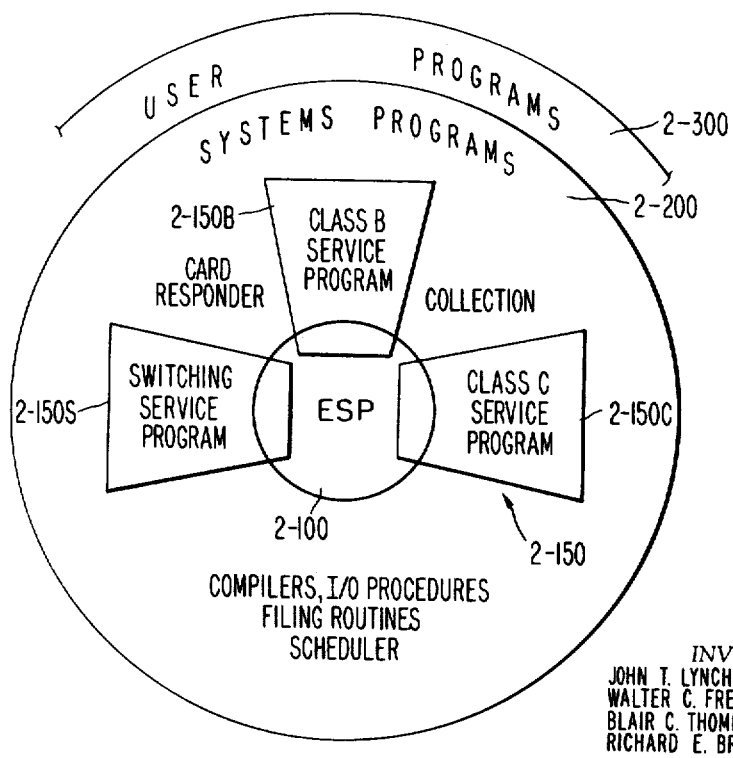
FIGURE 2 is a pictorial representation of the program types used to operate the present data processor and their respective interrelationships.

Next consider the circular diagram shown in FIGURE 2. Pictorially represented is the physical structure of the operating system used to control the system illustrated in FIGURE 1. The diagram is purposely simplified to illustrate the overall design philosophy used in its construction.

At the outset, it must be realized that the internal structure of any operating system is as important as the functions which that operating system must perform. As requirements for a given system change, the operating system must be flexible enough to easily accommodate change, else it is soon outdated. Previous systems having closely-knit and tightly-intertwined subroutines imbedded deep in the heart of an operating system vigorously resisted change. As previously mentioned, this problem has been overcome in the present system by extending the concept of modularity to the program structure.

In this way, individual portions of the system may be quickly and easily changed without impairing the operation of the remainder of the system. Thus, each subprogram is well defined and substantially independent of the operation of others.

It is readily seen in FIGURE 2 that this operating system is not a monolithic block of continuous instructions, but rather a functionally segmented collection of programs organized dynamically as the current system load dictates. The operating system has four general areas. The first one is shown as the central section 2–100 is the figure.

This program 2–100 performs those functions usually associated with an operating system, such as I/O control, interrupt control, timing, etc. Surrounding the ESP 2–100 are the programs which comprise the second general area. These are the systems programs 2-200. A systems program is perhaps best defined by referring to it as a unique type of user program. Thus, it is a user program which is permanently available for all users. As shown, they include programs such as compilers, I/O procedures, filing routines, and schedulers, etc.

The third area includes programs which actually serve a bridging function. These are the service programs. They are generally referenced as 2-150, however, in the figure, three such programs are specifically referenced as 2-150B, 2-150C and 2-150S. Respectively, they are the Class B service program, the Class C service program and switching service program.

Service programs 2-150, as pictorially illustrated basically possess the general characteristics of a systems program 2-200. However, they also possess the power to directly contact portions of the system normally reserved for the ESP 2-100. Thus, a service program may be defined as a program written much like a user program in compiler language, but possessing direct contact with portions of the system normally reserved for the ESP. An example of a service program would be a program allowed to communicate directly with Teletype channels as opposed to making a call on ESP to perform the communication.

The fourth area, as is apparent from consideration of the figure, covers all programs which are outside the system program area. This is the user program area 2-300 and consequently its contents will depend upon the particular use of the system.

Of the four areas, the ESP, 2-100 is undoubtedly the hardest part of any operating system to change. To reduce the necessity of such change, the present system provides an ESP having the smallest possible size. It has accomplished this by having service programs 2-150 perform many functions formerly performed by the executive programs. In this way, the service programs are easily changed, when desired, by recompiling the program and reentering it into the system.

Figure 4:
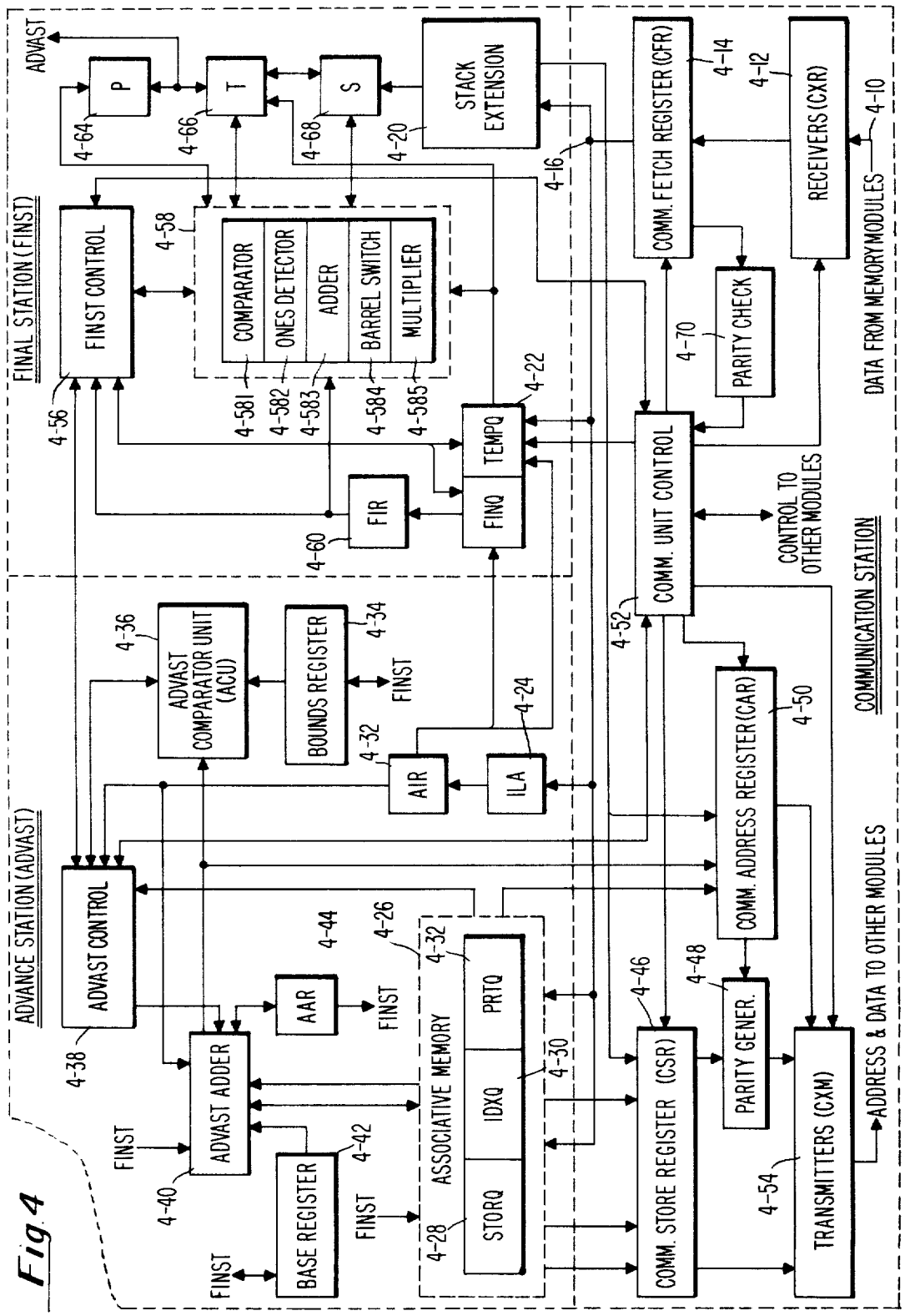
FIGURE 4 is a more detailed diagram of the same module.

FIGURES 3 and 4 both illustrate the Central Processing Module (also called the Computer Module) of the system. FIGURE 3 basically illustrates the separate units of the module and requires better explanation. FIGURE 4, however, illustrates the parts of the module in much greater detail and together with its description explains the operation of the module. As shown in FIGURE 3, each computer module 3-10 includes three separate units or functional stations: There is a communication unit 3-14, the advance station unit 3-18 and the final station unit 3-22. These latter two units are also referred to as ADVAST, 3-18 and FINST, 3-10 on the 52 line communication cable, 3-12. This cable is commonly connected to all of the memory modules in the system to receive information from a selected one of them from the communication unit, the input instruction enters the advance station 3-18. In this functional station the instruction receives any preprocessing necessary. If none is needed, the information is immediately transferred by way of interconnection means 3-20 to the final station unit 3-22. However, in any event, whether preprocessing is necessary or not, it should be noted that the information is immediately transferred from the communication unit into the advance station unit 3-18. This immediate transfer of memory information from the communication unit 3-14 frees the communication unit for immediate use. Similarly, in the event that the received instruction does not need preprocessing, it is immediately transferred from the ADVAST to the FINST. Consequently, the advance station unit 3-18 is immediately available for use. This immediate availability of the units and their substantially independent operation enables an overlap of operational processing which provides a considerable speed improvement in the overall execution of an instruction. Thus the basic design concept of each of the computer modules in the present system enables the performance of concurrent operations by each of these three stations or units. For example, the communication unit 3-14 can be exchanging data with other modules, while the advance station unit 3-18 is processing an instruction for fetching of instructions and data, and the final station unit 3-22 is manipulating data in its arithmetic stack.

Referring next to FIGURE 4, this same computer module will now be discussed in detail. Corresponding areas of the module shown in FIGURE 3 have been given similar designations in this drawing.

The Communication Station (COMM) which extends across the lower portion of the figure controls and executes all references to Main Memory by the Central Processor. It monitors portions of the Advanced and Final Stations (ADVAST and FINST) which periodically require access to Main Memory. There are four places in the entire module which require its service: The Stack Extension 4-20, the Temporary Queue (TEMPQ) 4-22, in the FINST and the Instruction Look Ahead (ILA) 4-24, and the Local Associative Memory 4-26, in ADVAST. The Local Associative Memory 4-26 consists of the Storage Queue (STORQ) 4-28, the Index Queue (IDXQ) 4-30, and the Program Reference Table Queue (PRTQ), 4-32.

The Stack Extension, 4-20 in FINST is serviced on a "need" basis. The Communication Unit monitors its contents and automatically executes store or fetch operations in order to maintain a certain predetermined number of operands for use by FINST. TEMPQ, 4-22 also in FINST, is serviced by the Communication Unit on a "demand" basis. ADVAST initiates all requests for service to TEMPQ. The Instruction Look Ahead (ILA) 14-24, in ADVAST is serviced on a "need" basis. The Communication Unit monitors ILA similarly to the way it monitors Stack Extensions, but in the case of ILA, service is a one way routine since there is never a need to store from ILA. The Storage Queue (STORQ), 4-28 in ADVAST is continuously monitored by COMM and serviced on a "need" basis. The STORQ 4-28 requires store only service and COMM will store data from it to Main Memory periodically in order to keep it available for use by FINST. IDXQ and PRTQ are serviced on both "demand" and "need." Any fetch reference made to Main Memory by the Central Processor that is relative to the Base Index Register (BXR) or the Program Reference Table (PRT) is placed in the Associative memory by COMM. If the IDXQ/PRTQ is full at the time, COMM will remove the oldest piece of data in the Queue and return it to Main Memory.

Aside from the particulars mentioned thus far, the other functions of the Communication Unit are the generation of parity on outgoing addresses and data, the checking of parity on incoming data, and continuous monitoring of interrupt lines from Memory Modules, I/O Modules, and other Central Processor Modules. In actual hardware, the Communication Unit consists of the Receivers (CXR), 4-12 and Transmitter Drivers (CXM), 4-54 for intermodule communications, the Communications Address Register (CAR) 4-50 for address buffering, the Communications Store Register (CSR), 4-46 for buffering of the write data, the Communications Fetch Register (CFR) 4-14 which buffers and acts as a distribution center for incoming data, and the Communications Unit Control 4-52 which performs the service monitoring, the priority and conflict resolution, and the control of all Processor Module to Main Memory Module operations.

The Advanced Station (ADVAST) shown in the upper left portion of FIGURE 4, is the program processing portion of the Central Processor. All ADVAST operations begin at Instruction Look Ahead (ILA) 4-24. ILA is a local memory unit used for buffering instruction words of the current program much in advance of their use. The capacity of ILA is 12 words at 52 bits per word. Since the longest instruction contains four six-bit syllables, the minimum buffering available is for 24 instructions. With this amount of "Look Ahead," it is not difficult for COMM to keep the ILA sufficiently ahead of actual ADVAST computation, thus masking the time taken in fetching program words.

Instructions are taken from ILA in sequence and placed in the ADVAST Instruction Register (AIR), 4–32. AIR holds the current operation code (OP CODE) syllable and associated variant and/or address syllables. The operation and variant syllables are decoded by ADVAST Control 4–38 to determine what operations are to be performed, if any, by ADVAST. The combination of OP CODE and variant syllables determine if there is address arithmetic to be performed; and, if so, what base register is to be applied and what limits are to be employed in the Memory Bounds Register, 4–34, check in the ADVAST Comparator Unit (ACU) 4–36. If the instruction involves an address computation which results in a memory reference, the address will be checked against the contents of the Bounds Register 4–34 in the ACU, 4–36, and any violation will cause an interrupt. The address will also be presented to the Associative Memory, 4–26 to determine if the word requested is stored locally in STORQ, 4–28, IDXQ, 4–30, or PRTQ, 4–32. If the requested word is not in local memory, the address will be passed on to the CAR 4–50 along with control information telling COMM where to place the contents of this address when it arrives from memory; therefore, if the word is intended for FINST, ADVAST need not wait for the fetch to be completed.

Once having initiated COMM, ADVAST is free to move on to the next instruction. If the requested address was one stored locally, the action of Associative Memory 4–26 would automatically cycle the local Queue and the requested word would appear at the output. If the requested word is to be used by ADVAST, it is available for computation at the Queue output; and if it is intended for FINST, ADVAST would transfer the word to TEMPQ which is the FINST local operand Queue. The ADVAST adder 4–40 is a three-input adder which enables one pass addition of the address syllables in the instruction string, a base register and an index amount. Indexing is applied to address computation by means of the ADVAST Address Register (AAR) 4–44 which is the accumulator for index arithmetic. The local Queue may contain up to 24 index words, thus enabling a good portion of all indexing to be accomplished without reference to main memory.

The PRTQ is the local storage for the most recent PRT relative references to Main Memory. This provides a local storage for control words used in program jumps, words containing alternate memory address bounds, and words containing indirect addresses. The execution of all program jumps are controlled by ADVAST. ADVAST also senses all interrupt conditions, responds to specific interrupt situations and controls the preliminary interrupt processing sequences.

All instructions executed in the Central Processor Module are handled by ADVAST. Those instructions which are strictly FINST operations are simply decoded by ADVAST and then transferred to FINST.

The upper right hand portion of FIGURE 4 illustrates the Final Station (FINST). This is the portion of the Central Processor which performs arithmetic and logical operations, and all stack and stack test operations. All FINST operations are initiated by the instructions taken in sequence from the Final Queue (FINQ) 4–62.

As ADVAST completes the preprocessing of FINST instructions, it places the OP CODE in FINQ, 4–62 and the associate variant syllables or locally stored operand in TEMPQ 4–22. If an operand is involved which must come from the main memory, ADVAST will present COMM with a TEMPQ address where COMM will place the operand when it arrives. All FINST operations involve the Stack Extension 4–20 and particularly the first two positions which are hard registers T 4–66 and S 4–68. These registers are also called the top of stack (T) and the second in stack register (S).

The Arithmetic and Logic portion 4–58 of FINST includes a Comparator 4–581 for all Stack and field testing and is also used for logical functions such as "IMP" and "OR" and some field manipulations such as "Clear Field" and "Complement Field." A "Ones Detector" 4–582 is used for normalization, and conversion from Integer to Floating. It is also used in Stack and field testing against zero. An Adder 4–583 is used for arithmetic operations only. Shifts and field manipulations are accomplished through a high speed shifting mechanism, herein called a Barrel Switch 4–584 capable of performing logical switching operations in a single time involving any amount of binary information.

FINST is actually under the control of ADVAST but cannot be stopped as long as there are instructions in FINQ 4–62. A special instruction does exist which halts FINST when it appears at the top of FINQ. The FINQ is allowed to empty on all Processor Interrupts before any of the interrupt service routines begin. All data stores to Main Memory are accomplished from the top of the stack register 4–66. On the command of a Store Stack to Memory Instruction, FINST will transfer the contents of the T register to the STORQ 4–28. FINST is dependent on ADVAST and COMM only to the extent that to be operating there must be something in line in the FINQ and TEMPQ storage registers. Therefore, as long as there is a queue of FINST instructions FINST does not have to wait on ADVAST or COMM.

There are three execution times specified for each instruction: one for the advanced station (ADVAST), one for the memory communication station (COMM), and one for the final station (FINST). The advanced station computes addresses, does indexing and index tests. The communication station provides communication between the computer module and memory modules, and the final station processes data and makes tests on data.

All instructions are processed by ADVAST where the instruction decoding also takes place. Some instructions will also be processed by one or both of the other stations (COMM and FINST). These stations are buffered so they can operate independently of each other. For example, when the ADD instruction is processed by ADVAST, it is put into the FINST queue where it waits to be processed by FINST. This permits ADVAST to begin processing the next instruction without waiting for the FINST to become available. The communication station is also buffered in this way, and as long as the buffers are not full, the stations are independent and can operate concurrently.

The execution time for a sequence of instructions can be approximated by separately summing the times for each station and then choosing the largest of these three sums.

Of course, where the instruction to be executed requires information which has not previously been used in the processor module, the station cannot continue until the word is obtained by the COMM. For example, where an index word required is not in local memory the ADVAST must wait until COMM has obtained the index word before it can proceed with the index arithmetic.

The time required for COMM to fetch instruction words is not changed as time involved in each instruction since COMM is capable of fetching instruction words much in advance of their use in ADVAST. These instruction words are fetched by the COMM and placed in the "Instruction Look Ahead" queue during periods that the other stations in the processor are not using its services.

Figure 6:
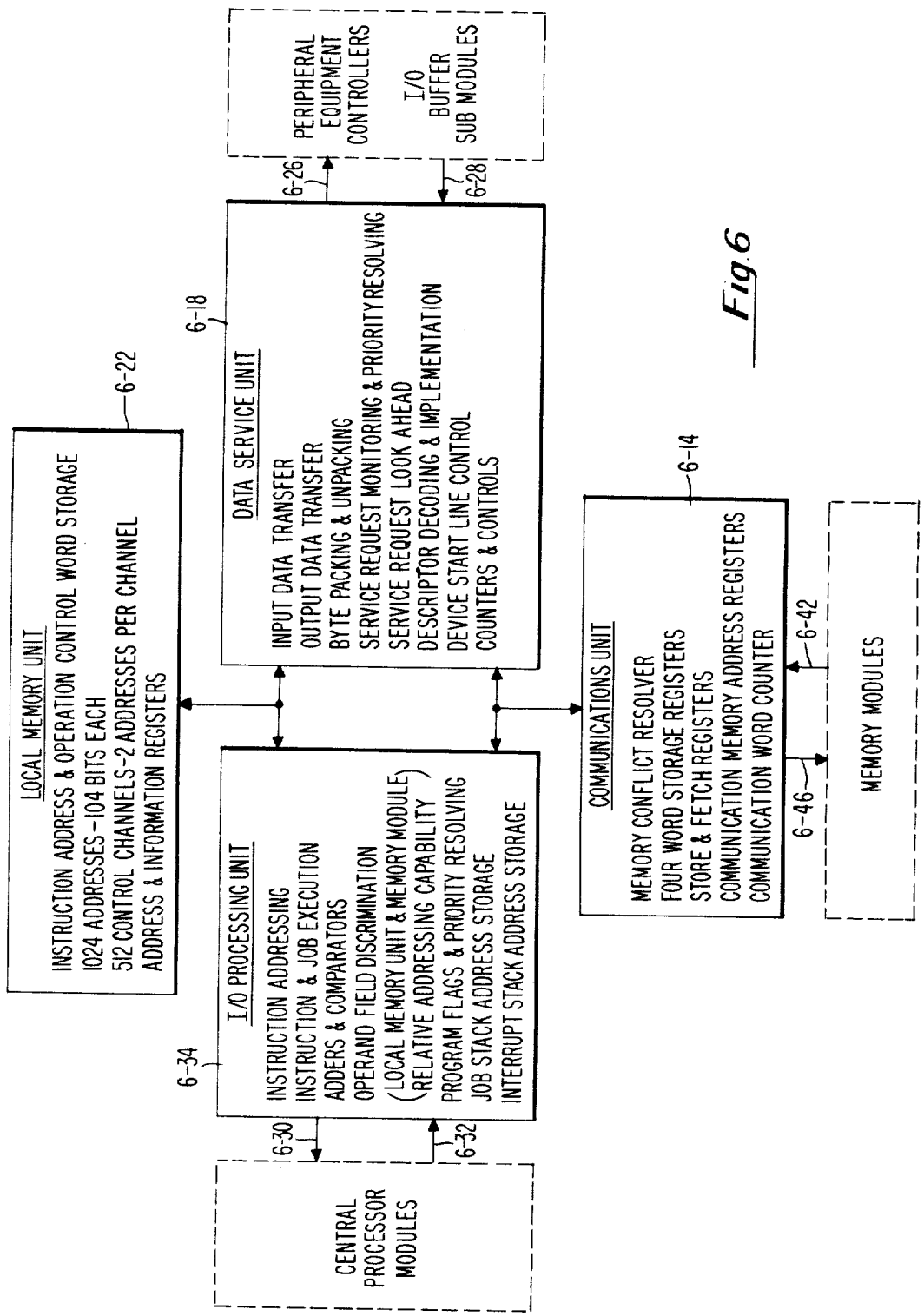
FIGURE 6 is a more detailed version of the same module.

FIGURES 5 and 6 each illustrate the Input/Output Control Module of the present system. FIGURE 5 is a simplified representation to broadly demonstrate the degree of concurrency possible within this module. FIGURE 6 specifies the structural and operational contents of each of the units of the I/O Module in a more definitive manner. Both drawings have corresponding layouts with reference numebrs which differ only in their initial digit. This first digit in each denotes the figure number in which they are used.

In FIGURE 5, the four functional units of the I/O Control Module 5–10 are shown: The Communication Unit, 5–12, the Data Service Unit, 5–18, the Local Thin Film Memory Unit, 5–22, and the I/O Processing Unit, 5–34. As is apparent from the drawing, the I/O Processing Unit 5–34 and the Data Service Unit 5–18 operate independently of each other and share the Communication Unit 5–12 and Local Memory Unit 5–22. Through cables 5–26 and 5–28 the I/O Module is capable of servicing 512 simplex peripheral devices independently. The control for each device is stored in two consecutive addresses of 104 bits each in the Local Memory Unit 5–22. The first address contains a double word of 108 bits (herein called a state word) which provides enough information to execute instructions, and locate buffer areas unique to the particular device. The second address holds a one word descriptor which describes the input or output operation. The second address also buffers one 51-bit word of data for all devices whose byte is one word or less. When the byte is greater than one word, it is buffered in the Local Memory Unit 5–22. The I/O Module by means of instructions and descriptor executions, creates sequences of operations involving several peripheral devices and performs an entire I/O procedure without the intervention of a Central Processor Module.

For example, an input/output operational sequence is initiated by the Central Processor Module shown in FIGURE 3. It transmits an 18 bit Memory Module address on cable 3–32. The I/O Module (FIGURE 5) receives the address on cable 5–32 wherein it is coupled directly to the I/O Processing Unit 5–34. This address points to an area in a specified Memory Module where a list of jobs is to be performed by the I/O Module is kept. Once the sequence is initiated, the I/O Processing Unit 5–34 executes the program necessary to set up a descriptor for the peripheral device and starts the same device. The I/O Processing Unit includes an arithmetic unit which constructs the descriptor as directed by the program. The descriptor is then transferred to the Local Thin Film Memory 5–22 via connection 5–36. When the Data Service Unit 5–18 has terminated execution of its present descriptor, it searches the local memory for the presence of a link descriptor and if one is found it executes it as well as each succeeding link descriptor until the operation is complete.

When this is accomplished, the Data Service Unit, 5–18, returns the operation sequence control to the I/O Processing Unit 5–36 by means of a program flag which identifies the operational channel. Thereafter, the I/O Processing Unit will interrupt the initiating Central Processor Module to inform it of completion of the operation.

Next refer to the more definitive illustration of the I/O Module of FIGURE 6. At the top of the figure is the Thin Film Local Memory 6–22. This Unit 6–22 stores two double words (208 bits) of control data for each of 512 simplex devices.

It also includes the location selection logic necessary for randomly accessing any of 1024 words of 104 bits each. The basic storage stack is a destructive-read thin film memory having a complete read-write cycle time of 500 nanoseconds. Addressing of this memory is controlled by a ten bit register. This address register takes its input from the Data Service Unit 6–18 or the I/O Processing Unit 6–34. Where conflict occurs, priority is given to the Data Service Unit. The Local Memory Unit also provides a buffer register which contains 104 flip-flops for the temporary storage of data being transferred into and out of it. These flip-flops are connected to the sense amplifiers to receive information being transferred from the memory during a read operation. They are connected to the information drivers during a write operation. They also may be connected to the descriptor and data registers of the Data Service Unit and the state register and accumulator operand register of the I/O Processing Unit so that they can exchange information with each of these registers.

The Communication Unit 6–14, shown at the bottom of FIGURE 6, coordinates the transfer of information between the Memory Modules and the I/O Module. As illustrated in the figure, it includes the necessary receiving and driving circuitry for communication with the memory as well as the required buffering circuitry. In order of their appearance in the figure, the Communication Unit 6–14 therefore includes:

(a) Memory Conflict Resolver.—This is the access priority logic which resolves any conflict which arises from simultaneous requests from a Memory Module by both the Data Service Unit 6–18 and the I/O Processing Unit 6–34.

(b) Four Word Storage Registers which provide the necessary storage required to advantageously exploit the four word fetch and store capabilities of the main memory.

(c) Store and Fetch Registers which provide the necessary buffering for information transferred to and from the main memory.

(d) Communication Memory Address Registers which temporarily store the address of the selected Memory Module.

(e) Communication Word Counter which provides the timing and control necessary during sequential operations.

The I/O Processing Unit 6–34 performs the program steps required to control the individual input-output channel operations. It is programmable and has access to any of the Memory Modules for instruction sequences or operands. Its organization is such that each control channel is capable of calling upon the appropriate program to service its needs. Channels which handle peripheral devices similar in nature are capable of making use of common program and unique data area without mutual interference. The functional capabilities of the I/O Processing Unit 6–34 are listed in FIGURE 6. Included among those listed are:

(a) Program Flag Responder.
(b) Control Unit.
(c) Arithmetic Unit.
(d) Adders having combinational logic which facilitates performance of arithmetic and logical operations. The inputs to the Adder are always enabled by the Accumulator Operand Register (AOR) and the Memory Operand Register (MOR).

(e) Field Discrimination Logic which includes combinational logic which produces a gating signal corresponding to each bit included in the effected field of partial field operations.

(f) Comparators having logic which compares the values of the Accumulator Operand Register (AOR) and the Memory Operand Register (MOR) for equality.

The Data Service Unit 6–18 manipulates descriptors and input-output information of varying byte sizes and speeds and has the capability of addressing 512 locations in the Local Memory Unit 6–22. Each location of 104 bits contains a descriptor word of 51 bits plus parity and a data buffer word of 51 bits plus parity. When a peripheral device having a data transfer byte size of one word or greater is used the data buffer word portion of the location corresponding to that device is not used. There are 512 service request lines and 512 start lines in the Data Service Unit, one for each simplex device of the system. The 512 control channels are organized into 256 output control channels and 256 input control channels.

To provide look ahead capabilities to the module, an input buffer register is provided which is capable of accepting as much as a word byte of data from an input device while the descriptor-data register is still busy processing a previous service request. The Data Service Unit packs and unpacks data bytes of a variety of sizes. When accepting inputs from a device, the packing of bytes is performed in shift logic on the data register while transferring the byte from the input buffer register. When sending outputs to a device, the unpacking is performed in shift logic on the data register while transferring the byte to the output buffer register.

A parity check is performed on the input buffer register and a parity is generated on the output buffer register. Once the operation indicated by the descriptor is exhausted, the Data Service Unit 6-18 determines whether the exhausted descriptor links to another. If so, the next descriptor is fetched from the next Memory Module address, i.e., the Memory Module address immediately following the block of data just transmitted.

An input operation occurs in response to an input device service request. At this time the Data Service Unit encodes the request into a ten bit address, fetches the descriptor-data word from the Local Memory Unit and stores it into the descriptor-data register. While this is taking place or at least before the previous response cycle is completed, a select strobe is sent to the initiating device to strobe the input data into the input buffer register. The byte size determines the amount by which the data register is shifted while accepting the byte from the input buffer register. Then, if the data word is full, a Memory Module cycle is initiated. Otherwise, the descriptor is updated and restored along with the data word into the Local Memory Unit 6-22.

An output operation, on the other hand, is initiated in response to an output device service request. As before, the Data Service Unit encodes the request into a ten bit address, fetches the descriptor-data word from the Local Memory Unit and stores it into the descriptor-data register. However, if the data word had already been fully transmitted, a Memory Module fetch cycle is initiated. The data register receives a data word from the Memory Module and prepares to unpack it into the output buffer register. The byte size determines the amount by which the data register is shifted while sending a byte to the output buffer register. As in the case of an input operation, when the particular byte has been serviced the descriptor is updated and restored along with the data word into the Local Memory Unit 6-22.

Figure 8:
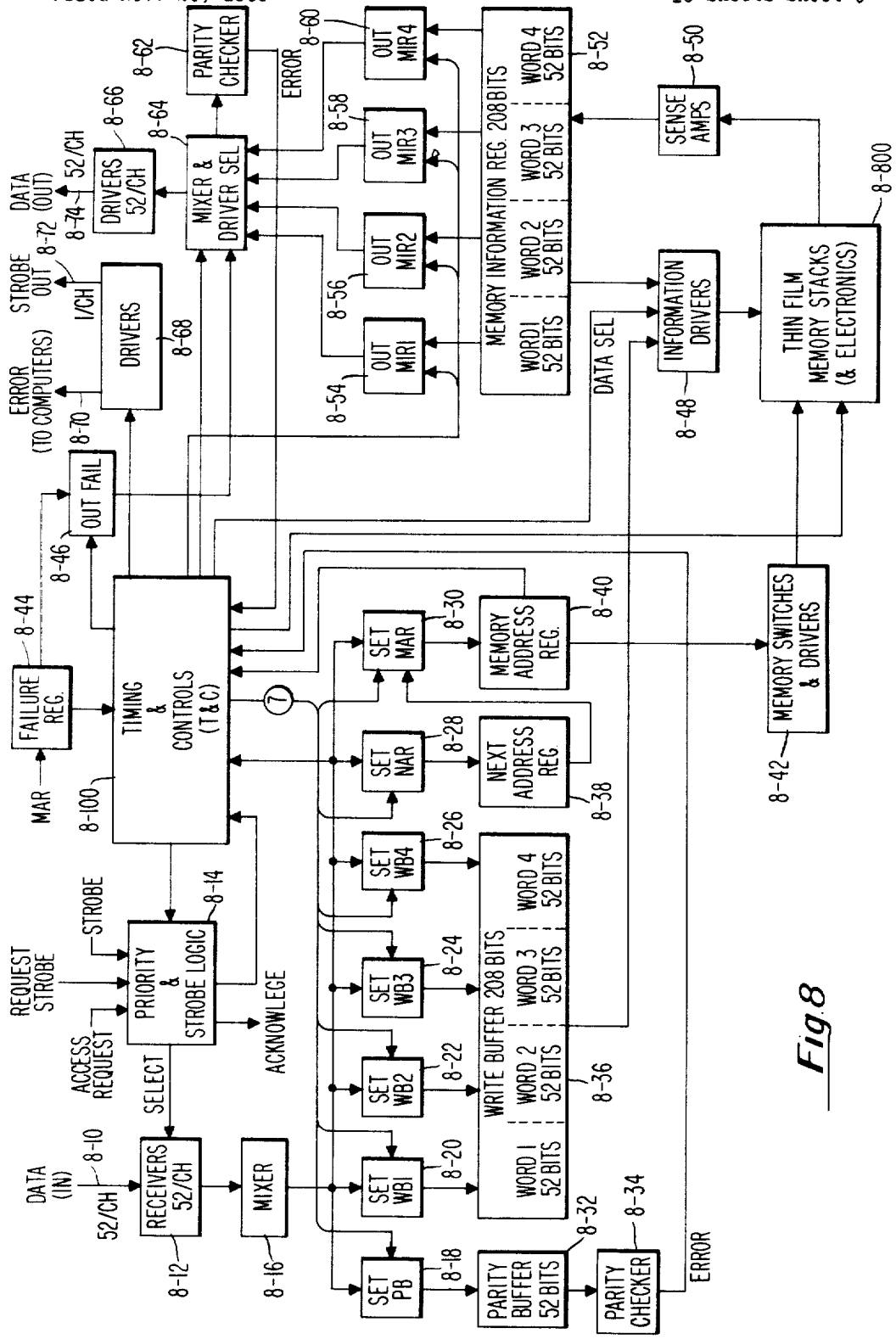
FIGURE 8 is a detailed block diagram of the same memory module.
Figure 9:
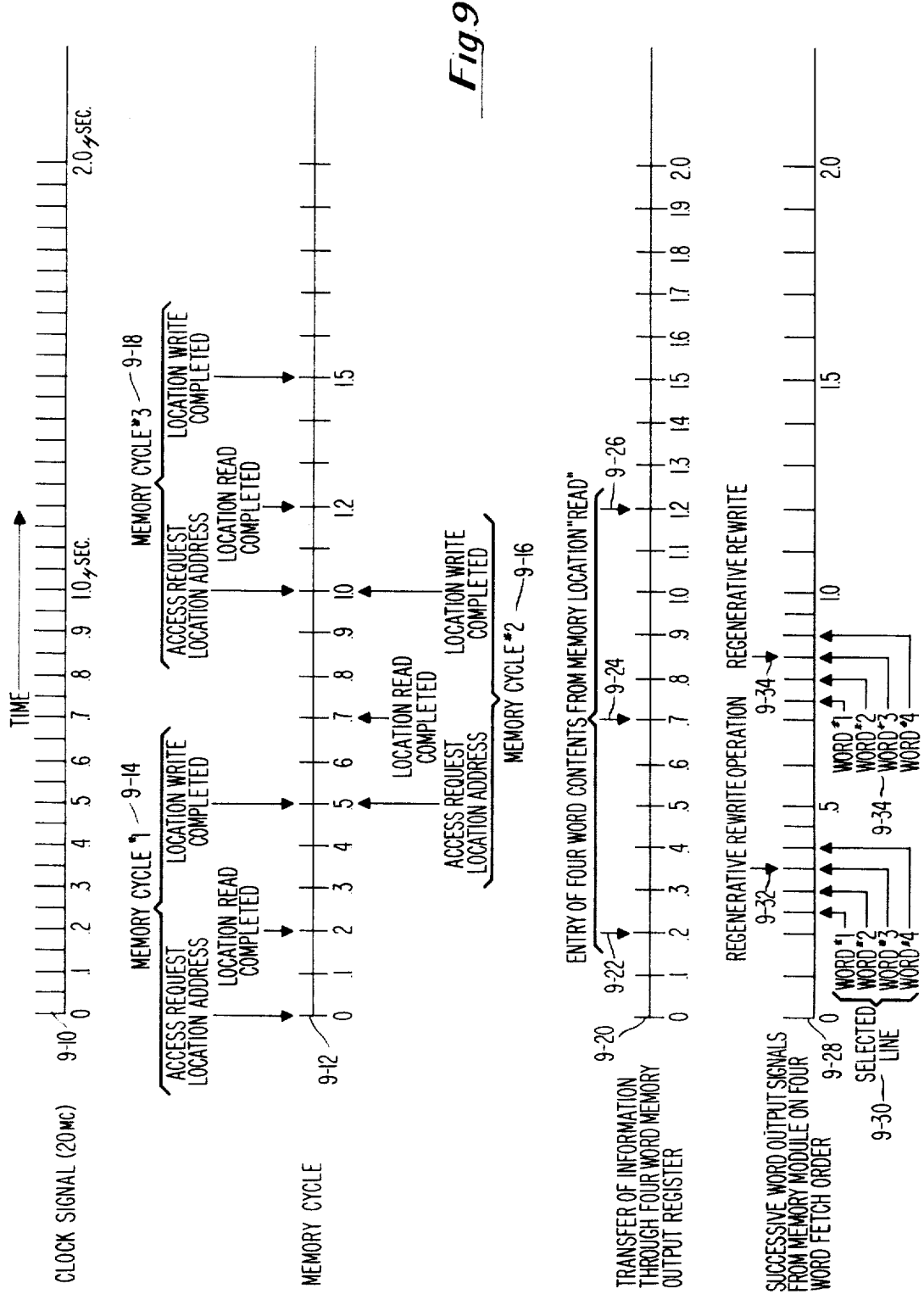
FIGURE 9 is a timing diagram showing a read operation of the Memory Module of FIGURE 9 in reply to a request for a four-word fetch.

FIGURES 7, 8 and 9 all refer to the Memory Module of the system. Both FIGURES 7 and 8 are block diagrams of the module, FIGURE 7 being drawn in a less complex manner to better illustrate its similarity to the correspondingly simplified version of the other two modules shown in FIGURES 3 and 5. Although it is the last described module herein, modularity may be said to begin in the Memory Module.

In FIGURE 7, the Communication Unit 7-14 of the Memory Module 7-10 is shown with its sixteen busses 1 to 16 (representatively drawn) connected for bidirectional communication with the remaining non-memory modules of the system. In each buss, a pair of 52 line cables provide input 7-26 and output 7-12 information to and from the thin film stack 7-18 via the selection drive lines 7-20 and the information drive lines 7-16. The basic parallel by multi-word thin film memory stack 7-18 is pictorially represented to illustrate its capability of four word fetch and store during a single access period. Thus, during a fetch operation, four words are simultaneously transferred from the memory stack via coupling means 7-22, 7-24, 7-28 and 7-30, to the Communication Unit 7-14. Each Memory Module of the sixteen allowable has complete accessing ability, independently of other Memory Modules. Consequently, there may be as many concurrent accesses as there are Memory Modules. Since each Memory Module has 16,384 words, the system memory capacity varies from 16,384 to 262,144 words in increments of 16,384 words. As many as 16 Computer and I/O Modules, in any mixture, can be connected to the Memory Modules used to form a system. Although conventionally shown as a matrix switch, as in FIGURE 1, the interconnections of the system are actually transmission busses used by the Computer and I/O Modules. Access is granted to and controlled by each Memory Module on a first come first served basis with concurrent requests for access resolved by a fixed priority.

Refer next to FIGURE 8 wherein is shown in addition to the memory stack 8-800, the independent address decoding, 8-16, 8-30, 8-40, driving 8-42, 8-48 and sensing 8-50 circuits. A single control logic and bus connection serves the stacks and four 52 bit words are accessed at each memory cycle. Wherever possible the hardware of the system takes advantage of this four-word memory operation to save time. As previously noted, I/O data is buffered in blocks of four words and the Computer stack extension is also in four word blocks.

As previously noted in the description of the I/O Control Module, I/O data is buffered in blocks of four words. Similarly in the Computer Module, the stack extension is in four word blocks. Also instructions are fetched in four word groups.

Any single word in a Memory Module can be addressed. The Memory Module cycle time of 0.5 microsecond is derived from an access time and destructive read of 0.3 microsecond, and a restore and recovery time of 0.2 microsecond. The memory can be used at an access rate of 2.0 megacycles continuously.

Returning to FIGURE 8, data enters the Memory Module through the input cables 8-10 of each of the 16 busses to a plurality of receivers 8-12. In the event that access to this module is simultaneously requested by more than one non main memory module of the system, the priority portion of the logic circuitry 8-14 provides a select signal to the receivers 8-12 to enable the transfer of a request word. The request word on the data lines accompanies the request signal sent to the priority and strobe logic 8-14. The request word contains a word address within the stack 8-800. It also includes an operation code describing one of the following operations to be performed:

(a) Fetch a single word.
(b) Fetch four consecutive words.
(c) Store a single word.
(d) Store four consecutive words.
(e) Fetch a single word and modify the tag code.
(f) Fetch the Memory Fail Register.

A store (write) operation is initiated by the receipt of a store type request word on the input lines followed by the data to be stored. This data is then stored at the address specified by the request word. This operation at this point is word sequential in that one 52 bit word enters at a time.

If the operation indicated in the request word is "store a single word," the mixer 8-16 transfers the 52 bit data word into the proper word position. The 208 bit write buffer 8-36 by enabling (set) one of the appropriate write buffers WB1, WB2, WB3 and WB4.

These gates are also referenced as 8-20, 8-22, 8-24, and 8-26. Corresponding gates are associated with the parity buffer 8-32, the next address register (to provide linking capabilities) NAR 8-38 and the Memory Address register 8-40. These gates are respectively referenced as SET PB, 8-18, SET NAR, 8-28 and SET MAR, 8-30. The contents of the Memory Address Register 8-40 are applied to activate the proper memory switches 8-42 which in turn, drive the selected memory line in the thin film stack 8-800.

During this sequence the contents of the Write Buffer correspondingly activate the information driver 8-48 of the stack 8-800 and the simultaneous application of the drive line signals cause the data to be stored at the selected word position of the four word location. It is noted here that the memory cycle is invariably first a read, then a write operation. The memory cycle can be considered a wrap around or closed loop operation. The sequence of events during a thin-film memory cycle is:

(1) Word address is decoded in address register 8–40.

(2) Word address is gated to word drivers and switches 8–42. That is, the thin-film memory is energized at the proper address.

(3) The entire 208-bit word is read out of stack by activation of all information drivers 8–48, are sensed by the sense amplifiers 8–50 and retained in the information register 8–52. This is the read time. Parity of the output word is checked 8–62 and the 208 bits of information are gated (or "wrap around") to the information driver inputs 8–48.

(4) During this time the fetch or store instruction has been given to the gating on each bit line which returns the data to the thin-film memory through the information drivers 8–48. On a fetch command the entire 208 bits of information in the information register 8–52 are read back into memory by way of the four buffer registers 8–54, 8–56, 8–58 and 8–60. On a store command the new information is gated to the correct information drivers by the information contained in the address bits. This is the data select line from Timing and Control 8–100.

(5) This memory timing 8–100 also energizes the information driver 8–48 circuitry. The data at the information driver input is written into the memory. Words not addressed on a store command are written back into memory unchanged. Thus it is possible to address a single word for data handling of any kind without disturbing adjacent words though four words are read out of memory each memory cycle.

(6) With the desired information in the thin-film memory addressed locations and with all drivers and switch circuitry de-energized the memory is ready for the next cycle.

A group of timing diagrams corresponding to the above operational sequence of a memory cycle are illustrated in FIGURE 9.

A timing reference or clock signal 9–10 is representatively shown at the top of the figure. A clock rate of 20 megacycles is noted as the system timing signal.

Immediately below the clock signal diagram is a memory cycle diagram 9–12 which shows a first, 9–14, a second, 9–16, and a third, 9–18 memory cycle. Within each cycle period of 500 nanoseconds are shown the respective times required to effectuate a read and a write operation. These times of course, correspond to that given previously in this description.

Next in order is a timing diagram noting the transfer times through the four word output register 9–20. The respective arrows 9–22, 9–24 and 9–26 reference respective times at which a four word readout has occurred in response to a four word fetch signal.

The botom timing diagram 9–28 of FIGURE 9 illustrates the times at which one 52 bit word of the four in the output register is transferred. Thus, the four word contents of the output register are transferred out of the module in a word by word sequence at the clock rate of the system. For example, if the present memory were accessed by a serial sequence of one word fetch signals, the total time required to obtain the four words would be 4×500 or 2000 nanoseconds. Comparing this period with the diagram 9–28 it is seen that four successive words may be obtained in less than one cycle of time of 500 nanoseconds (approximately 400 nanoseconds). The increase in speed realized is therefore on the order of 4 to 1 with the present configuration.

Figure 10:
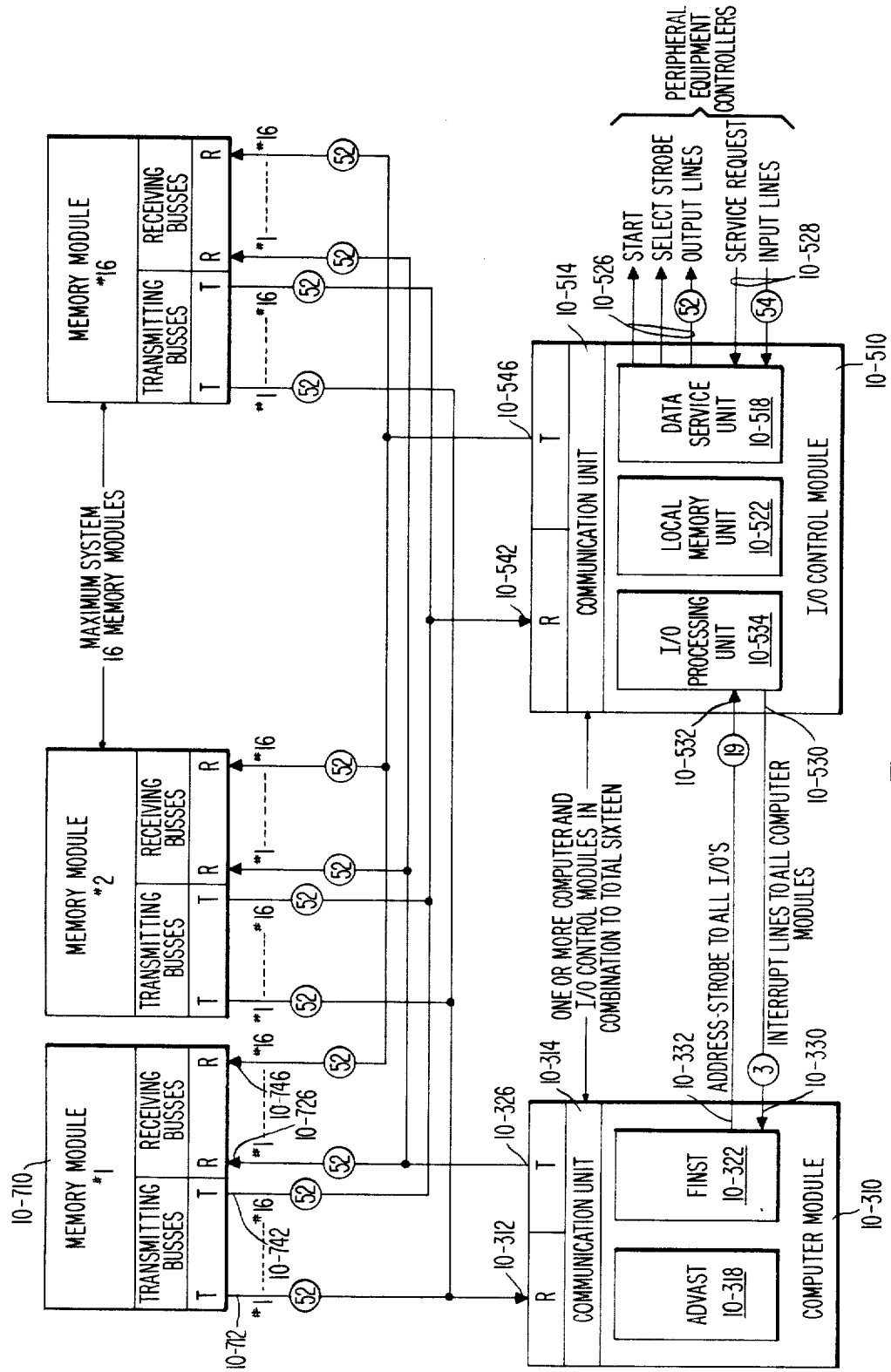
FIGURE 10 is a system interconnection diagram of the functional modules.

FIGURE 10 is a system configuration illustrating the interconnections involved between the functional modules of the system. As a means of cross-referencing, the respective reference numerals used in each of the module figures have been included in the present drawing following the basic numeral 10. Thus, the Computer Module 3–10 shown in FIGURE 3 is referenced herein as 10–310. In addition, for purposes of clarity, only one module of each functional type has been numerically referenced. It is, of course, understood that all sixteen main Memory Modules allowable in a maximum system of the present invention are identical. Similarly, all modules of each of the remaining two functional types used herein are also the same.

Referring to FIGURE 10, a representative Memory Module 10–710 is shown having 16 transmitting busses and 16 receiving busses. Transmitting bus #1, 10–712 is commonly connected to the transmitting bus #1 on all other Memory Modules used and this common transmitting bus #1 is then applied to the receiving bus input 10–312 of the Computer Module 10–310. This procedure of common connection is then repeated for each of the remaining transmitter busses up to #16, 10–742. Each common transmitting bus being respectively connected to the receiving bus of an individual module in the mixed module group of Computer I/O Modules.

Similarly, the #1 receiving busses of all sixteen Memory Modules are joined together with receiving bus 10–726 and connected to the transmitting output portions 10–326 of the Computer Module 10–310. The remaining 15 receiving busses, including bus #16, 10–746 are correspondingly connected to respectively numbered receiving busses on all Memory Modules and individually connected to the transmitting portion of each module in the mixed module group.

Peripheral equipment controllers (not shown) are used in this system to provide the proper interfacing of control signals and data 10–526 and 10–528 between the I/O Module 10–510 and various peripheral equipments. These controllers supply the proper amount of data buffering to insure that no data is lost while the I/O Module is servicing other channels.

The I/O Control Module 10–510 has the capability of interfacing with 512 such peripheral controllers over individual channels. These consist of 256 input channels and 256 output channels. The following three signals are associated with each of these channels. As listed below, the start and select strobe lines are included in cable group 10–526 and consequently have a signal flow in the direction of the controllers. The remaining line, carrying the service request pulse, is in cable group 10–528 whose signals flow toward the I/O Module.

(a) The start line initiates data transfer between the I/O Module and the particular controller.

(b) The service request pulse informs the I/O Module that the controller has received the start line and that the controller is ready to accept or send data. The response to this request is handled on a priority basis by the I/O Module.

(c) The device select strobe is a pulse sent to the particular controller in response to the service request. For an input device, the device select strobe pulse shall be returned to the I/O Module along with the byte of data and a status line which determines whether the data on the lines can be considered as good data or terminating status. For an output device, the device select strobe pulse enables the transfer of the output data into the submodule.

Data transfers between the I/O Module and the peripheral device controllers are handled, where feasible, on common lines. The I/O Module has the capability of communicating over 64 separate data busses. These consist of 32 input data busses, one of which is representatively included in cable group 10–528 and 32 output data busses shown in cable group 10–526. Each of the data busses has the capability of receiving or sending a byte size of 51 bits plus parity in parallel, the byte size determined by a particular configuration. For example, if the I/O Module communicates with 8–100 w.p.m. Teletype lines, a byte size of 6 bits would be sufficient to insure that each of the individual Teletype lines were serviced without the loss of data.

Programs executed within the I/O Processing Unit 10–534 are associated with one of the 512 simplex channels. Each channel status word contains an instruction base address, a parameter address, and a relative instruction count. Hence, there exists the capability to assign a unique program and data area to each channel or to have a common program executed by many channels, each channel having its unique data area. Each program has an associated subroutine reference table which contains the absolute address of all subroutines referred to in the program. This table is readied when the program is loaded.

Associated with each I/O Module is an area in one of the main Memory Modules 10–710, called the Job Stack. This Job Stack is used by the Central Processor Control Program to directly communicate with the I/O Module 10–510.

Allocation of the I/O Module Job Stack is the responsibility of the Central Processor Control Program operating on a Central Processor Module 10–310. The current address of the Job Stack is maintained within the I/O Module in a register correspondingly named Job Stack Address Register (JSAR). This register is loaded directly from the T register 4–66 of the Central Processor Module shown in FIGURE 4.

There are five types of entries in the Job Stack. These entries are either new channel state words or a modification to a current channel state word. The five word types and a brief description of each of the words follow:

(1) NEW JOB WORD.—This word contains complete information regarding the state of a channel, i.e., this state word assigns the channel designated by the channel number field, specifies a program area, given an interrupt base address (IBA) setting, defines a parameter area, indicates the PBA setting, and provides the interrupt control bit for the channel.

(2) NEW PBA WORD.—This word provides the designated channel with a new Parameter Base Address.

(3) STOP WORD.—This word allows the Central Processor Control Program to stop operations on the designated channel.

(4) NEW JOB STACK ADDRESS.—This word contains the new setting for the Job Stack Address (JSA) register. By placing this type word in the last position of the current Job Stack, the Central Processor Control Program defines its extent and provides an Address Link to the next Job Stack area.

(5) NEW INTERRUPT STACK ADDRESS.—This word contains the settings of the two registers within the I/O Module. The Interrupt Stack Limit Register (ISLR) controls the operation of the I/O Module Interrupt Stack.

A communication between the Central Processor Module 10–210 with the I/O Module 10–510 proceeds as follows: Assume that the allocation and setting of the Job Stack Address Register (JSAR) has taken place. The Central Processor Control Program finds and allocates the necessary objects for the desired I/O function. After readying the parameter area, the appropriate state word is generated and stored with a presence code in the next available position in the Job Stack. The Central Processor Control Program then executes the I/O instruction which sets the program flag corresponding to the Job Stack control channel in the I/O Module 10–510.

Within the I/O Module 10–510, the service of the Job Stack occurs when the program flag for the Job Stack channel has priority and the I/O Processing Unit 10–534 is free. The Memory Module address obtained from the JSAR is fetched and the presence code reset using the READ MODIFY WRITE Memory Module operation. The word including an unmodified presence code is transferred to the I/O Processing Unit 10–534. The reading of word with the presence code set from the Job Stack causes the following:

$$JSA \leftarrow JSA + 2$$

In the presence code is reset, the program flag associated with the Job Stack will be reset.

The processing function and the disposition of the I/O Processing Unit is dependent on the word type.

A NEW JOB entry will cause the I/O Processing Unit 10–534 to:
 (1) Be assigned to the channel designated in the word,
 (2) Execute the program defined by the base registers contained in the word.

A NEW PBA entry causes the I/O Processing Unit to:
 (1) Be assigned to the channel designated in the word,
 (2) Execute the program at the channel's current IBA with a new PBA.

A STOP entry causes the active bit in the designated channel state word to be reset and the I/O Processing Unit is released. For a channel to use the I/O Processing Unit, the active bit must be set. The start line for that channel must also be reset.

A NEW JOB STACK ADDRESS entry causes the JSA to be loaded from the entry, and the I/O Processing Unit is then released.

A NEW INTERRUPT STACK ADDRESS entry causes the Interrupt Stack control registers ISAR and ISLR to be loaded from the entry, and the I/O Processing Unit to be released.

Those conditions which I/O Module programs recognize to be Central Processor Control Program interrupts are communicated to the Central Processor Control Program through the I/O Module Interrupt Stack. Each I/O Module is allocated one Interrupt Stack in the Memory Module by the Central Processor Control Program. The Memory Module assignment is transmitted to the I/O Module through its Job Stack. Two registers within the I/O Module are associated with the Interrupt Stack. They are: the Interrupt Storage Address Register (ISAR) and the Interrupt Storage Location Register (ISLR). ISAR always points to the next available location in the Interrupt Stack, while the ISLR contains the number of positions in which the I/O Module can still make entries. Each entry in the Interrupt Stack is made under program control from the I/O Processing Unit 10–534 by way of interrupt lines 10–530.

There are three interrupt lines shown in the cable 10–330 as it enters the Computer Module 10–310. They carry the I/O Complete Interrupt signal, the Parity Error Interrupt signal and the No Memory Access Interrupt signal.

Figure 11:
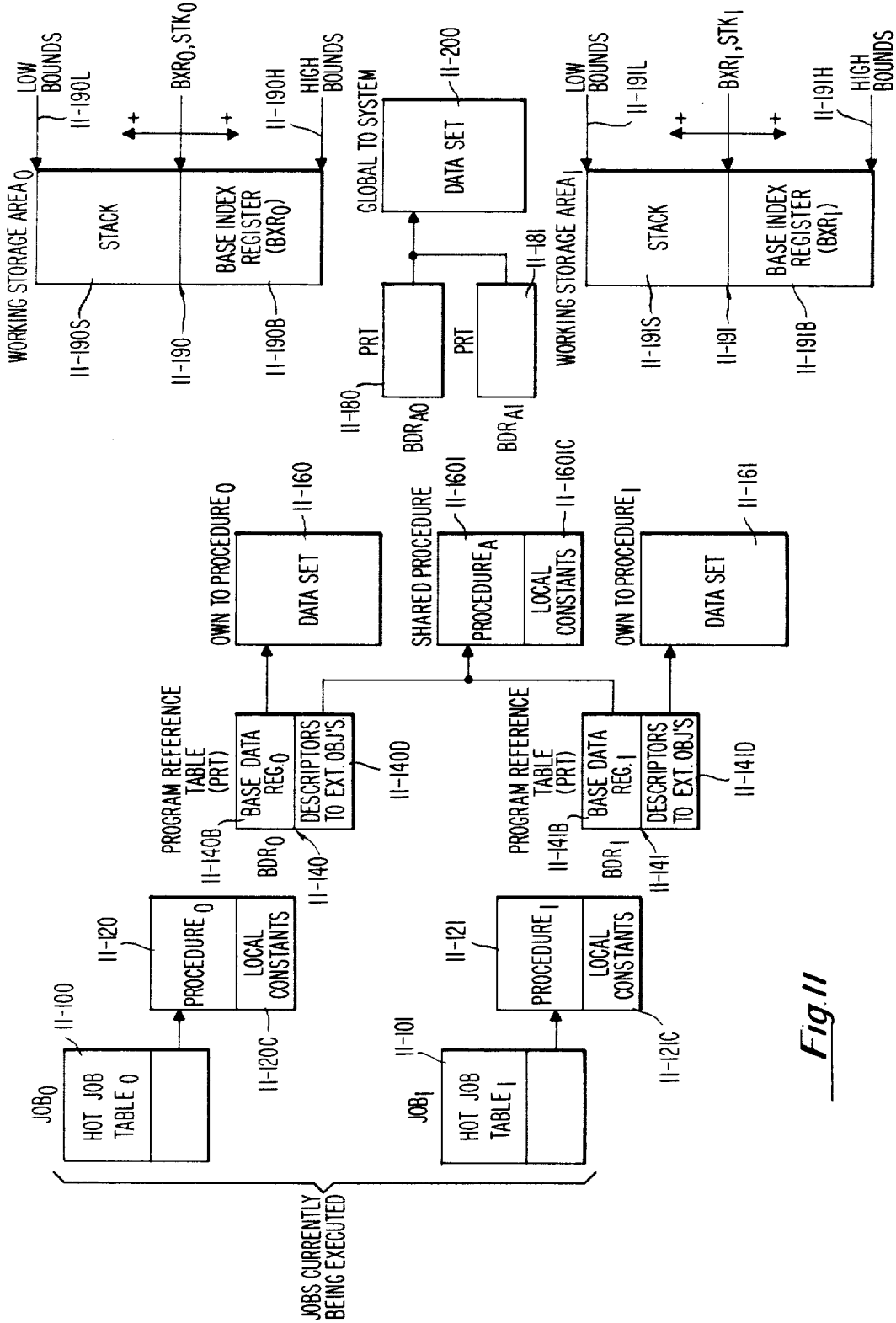
FIGURE 11 is a diagrammatical representation showing the modular structure of the control program operating system.

Referring next to FIGURE 11, where the modular structure of the present operating system is illustrated.

The creation of the first modular systems while revealing a considerable number of desirable traits, also created a number of undesirable features not heretofore present. For example, it pointed up the undesirability of placing a modular system emtirely at the disposal of a single user for the duration of his job. Rather, it became apparent that only those facilities such as memory, peripheral devices, computers, or service programs which are needed at each segment of the job should be allotted to him; the rest of the system should be used for other tasks. This operating philosophy led to the consideration of the present executive program in which it is considered a "fourth module" whose design and use significantly influences the design of the Memory, Computer and I/O Module hardware.

The executive program usage in the system requires complete independence of memory location by all program segments. Thus, in both the Computer and I/O Modules there are provisions for fast relative and indirect addressing. Ability to change jobs rapidly is important to multiprocessing, therefore the saving and updating of control registers is automated for speed. Such a design definitely discourages a mode of operation which is common for systems of an earlier generation whereby a main program and its various subprogram parts are collected, by hand or by a "load time fix up" program, into one contiguous block of memory and given control of the system. The design of this system and its intended use seem rather to indicate a mode of operation in which many more-or-less unrelated tasks are being performed at the same time. Many standard jobs are being performed in response to external stimuli, and involved structures are set up to process large tasks. In such an environment then, the Executive and Scheduling Program (ESP) must have access to a very large set of programs and data complexes (which it can call upon without any human intervention) that are grouped into some logical order or file. The file must not only contain the programs themselves, but also a description of the programs, providing information of constraints, requirements, and interrelationships. The greater part of this information is collected and appended automatically to each program by the programming system.

To construct a reasonable program structure which allows multiprocessing, effective memory usage, and program protection, programs and data sets are constructed as logical elements or segments. Such a structure is shown in FIGURE 11. Programs are assembled as closed procedures 11–120, 11–121 while data sets 11–160, 11–161, 11–200 are classed as either "read only" or "read or write." Programs may be shared by other program or jobs such as 11–1601 is shared by procedures 11–120 and 11–121. However, data sets may be shared within jobs, or may be unique to one procedure. For example, data sets 11–160 and 11–161 are unique procedures 11–120 and 11–121 respectively. A job therefore may be a rather involved structure of these types of segments which are allocated separately in memory and are present only when required during the execution of the program. Since procedures may be shared across jobs, it is apparent that the procedure may not use any portion of its segment body as a storage area. Therefore, for each separate job there must be provided sufficient working storage area for execution of the program structure. Thus, for $JOB_0$ there is provided WORKING STORAGE $AREA_0$.

Any interesting program will probably need to refer to programs and data which, for various reasons, cannot conveniently be placed within the body of one procedure (system procedures, arrays, shared procedures, etc.). Such objects, allocated independently of the procedure which refers to them, are herein termed "external." References to these external objects must evidently be indirect, via descriptor words associated with the procedure, if an expensive run-time assembly pass is to be avoided. The set of these descriptors—one for each external object, is called the Program Reference Table (PRT). In FIGURE 11, a set of these descriptors 11–140–D is in PRT, 11–140. Note that there may exist several PRT's corresponding to one procedure since, as previously noted, the assumption has been made that any procedure is capable of being executed by two jobs without mutual interference. To allow multiple usage of procedures, it is necessary that each have its own PRT and its own temporary storage area. Hence, the true programmatic entity in the machine corresponds to the procedure comprising not only the code to be executed but also local constants, together with that particular PRT and working storage which was established for this particular use of the program. This would therefore include for $procedure_0$, 11–120, the local constants 11–120C, the PRT 11–140 and the $AREA_0$, 11–190.

External objects for a procedure fall into two separate classes: those which are necessary to the procedure, and those which are conditional. The necesary objects are made available to the procedure (readied) at the time the procedure itself is referenced by it caller, while those which are conditional are readied only when referenced or when requested by a procedure through a service call on ESP.

These objects are also classified as being own to a procedure, own to a job, or global to the system, as are the Data Sets.

Finally, in order to associate a program structure with a certain flow of control or job, it is necessary for the ESP to allocate for each job, a storage area wherein there may be temporarily tabled a block of words sufficient to store all the computer registers which must be saved to completely disconnect a computer from the program it is running and later resume execution of the program. Such a table is provided herein for the entry of such information and is called a HOT JOB TABLE (HJT). Thus, $HJT_0$, 11–100 is included with $JOB_0$.

In order to have a job made active in the system, the collection program must have opened the job file (s) and made known to ESP the name and file name of the first program segment to be executed and the required amount of working storage space for execution of the program. Memory space is then allocated for the working storage area 11–190 and the Hot Job Table, 11–100 and the necessary control information concerning the storage area is placed in the Hot Job Table. Specifically, this control information includes the memory bounds 11–190H and 11–190L, the location of the base index register 11–190B and the stack, 11–190S. A conditional PRT line is established in the HJT for the first procedure and the base data register (BDR) is set at that address. An ESP operator is executed by the ESP which transfers control to a starter routine whose function it is to ready the called procedure and its necessary external objects, set the BDR at the PRT block of the called procedure, and transfer control to that program segment.

Sets of named objects which, in some sense, logically (but not necesarily physically) belong together are grouped by the ESP and herein called a file. A system of such files is maintained by the Executive and Scheduling Program (ESP). At the base of the ESP filing system there exists in main memory (but available to the ESP only) the System Directory which contains the name, size and location of the File Directory for each file which is active in the system. A file is considered active as long as there exists a job in the system which refers to an object on that file. There exists on disk an Inactive File List which contains the same information as the System Directory for all inactive files within the system. These are files which have frequent use or have been established by the Collection function for jobs which are to be entered into the system. Each File Directory in turn contains the name, size, and location of every object in the file. The File Directory remains on the disk and is allocated main memory only as long as the Locator function requires it for readying objects from the file. Whereas data sets are contained as single objects on the file, a procedure is filed with its PRT block and a description of the amount of working storage area required for it.

It is obvious that the filing system must contain a library of procedures necessary to implement the bookkeeping requirements of the system. These include appending File Directory information to the System Directory and Inactive File as well as adding and deleting objects to and from a file. Whereas these procedures will most commonly be employed by ESP and the compilers, they are available to user programs so that each user may construct and maintain his own personal file.

A disk memory is used by the present system as its primary bulk storage medium for containing input and output data files and program files currently being referenced. Disk usage may be separated into these six categories: (1) storage for ESP functions and tables; (2) system program files including compilers, mathematical libraries, I/O procedures, etc.; (3) input data files; (4) output data files; (5) user program files currently in use; and (6) working storage area for running programs. It appeared unreasonable that one standard disk allocation method could satisfy the diversified requirements for each of these areas of usage. Therefore, the present system enables each separate area to allocate its disk segment as it requires and will only request external ESP service when conditions occur which will effect total system service.

Requirements of ESP and its associated tables and of the system program files are such that these objects must remain permanently on the disk and can never be reallocated on the disk.

In order that ESP Ready Function may locate and input a requested object in minimum time, program files are stored on the disk in consecutive locations, so that the File Directory need contain only the starting address and length for each object in the file. When the disk space allocator for the program file segment determines that sufficient space is unavailable for a new file to be entered, it requests the filing system function to remove those files from the disk which are no longer in use or are of infrequent use. The file(s) to be removed is determined by consulting the file reference count and removing the file(s) with the smallest count. The file reference count is incremented each time an object on the file is requested, and decremented each time the object is released.

Figure 12:
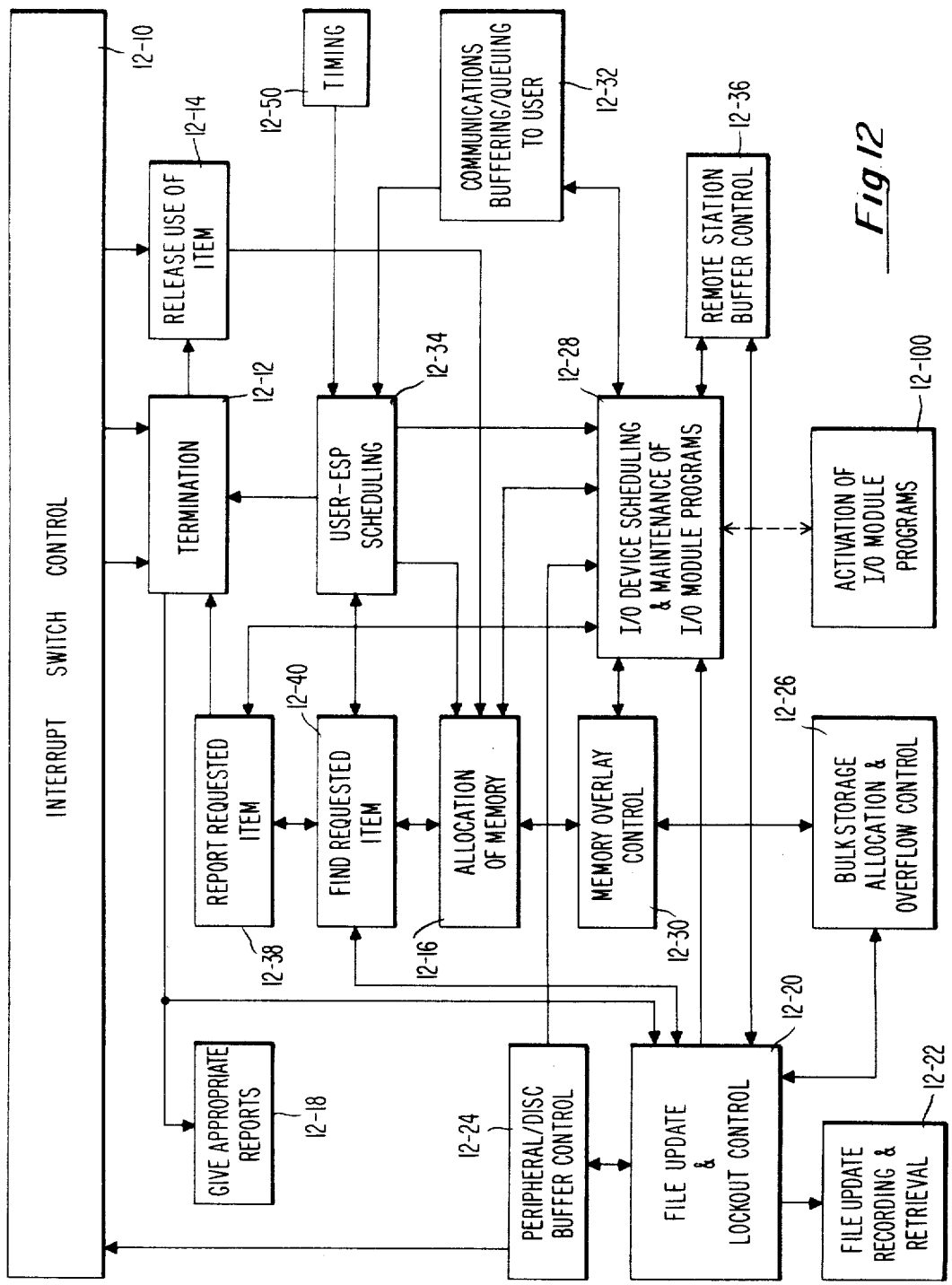
FIGURE 12 is a block diagram illustrating the interval functional portions of the Executive and Scheduling Program (ESP)

Refer next to FIGURE 12 which is an internal functional block diagram of the Executive and Scheduling Program (ESP).

An interrupt switch control 12–10 across the top of the figure is responsive to a large spectrum of interrupts; both those generated within the Computer Module and those received from sources external to the computer Module. Interrupt processing for the Computer Modules is the interface between the Executive and Scheduling Program and its dynamically changing environment. Every interrupt received by a Computer Module is an indication to the Executive and Scheduling Program of some set of functions which have to be performed, are being performed, or have been performed. The function of interrupt processing is to evaluate and pre-process each interrupt prior to passing it on to the major portion of the ESP for final disposition.

A judgment must be made on each interrupt condition to determine if it is to be passed on to the ESP or handled completely by the interrupt processor. Those interrupts which are passed on to ESP are mapped into a consistent form to allow convenient and economical handling by the appropriate ESP routine.

Those ESP functions which can be completely handled by the interrupt processor are placed in a group specified Class I interrupts. In particular, those functions which are related to program interfaces and interprogram communication will be implemented by ESP macro calls. These macros will not require extensive processing, but will be executed fairly frequently. Included in this class of macros will be those functions normally associated with entrance to and exits from programs. These blocks of code are normally associated with each program and much unnecessary duplication can be expected in a multiprogramming environment. In the present case, this type of code will exist once and be called by macro call as needed, a trade being made for space at a very small cost in execution time. Each macro of this class will be handled individually and will not require the normal overhead associated with handling all interrupts enmass.

One prime use for the interrupt system is to invoke the ESP. This is accomplished either through a program generated interrupt or a hardware generated interrupt. These interrupts are specified as Class II Interrupts. The communication between user programs and ESP is exclusively through the interrupt system using macro calls. User macro calls are in general requests for ESP service that requires extensive processing such as information retrieval, allocation, input/output, etc. In most cases return to the program that initiated the interrupt will not immediately follow the ESP processing of the interrupt. Other programs will be scheduled while the requirements specified in this and prior macro calls are being satisfied. The interrupt processor therefore assumes that control will not return immediately to the caller and saves the appropriate registers and information required to establish the computer-independent state of the program. This information is stored in the Hot Job Table of the job which either caused the interrupt or was active in the computer when the interrupt occurred.

The interrupt processor performs hardware related functions such as changing the mask register, bounds register and base registers in preparation for entering ESP in ESP mode. For certain interrupts, items of interest are recorded so they may be passed on to the ESP.

The following description taken with the block diagram of FIGURE 12 describes the characteristics and the overall flow for the Executive and Scheduling Program (ESP), of the present system.

In order to simplify the description, a number of definitions and terms are initially set forth and described.

As a new job enters the system it is processed and scheduled as a cold job. Cold jobs are descriptions of potential candidates for execution. A collection of these cold jobs maintained on bulk storage are called the cold job table. A cold job entry remains in the system from the time it is introduced for running until its outputs are delivered. Information contained in the cold job include the method of determining its priority, the class of job (conversational, batch, deadline, real time), estimated running time, amount of storage required on various media, names of programs required, names of input files required, predecessor cold job links, age, data files, maximum core block size, etc. To summarize, the information contained in cold storage is that required to efficiently introduce jobs into the system based on current and anticipated computer load matched against inherent importance of the function to be performed.

Cold jobs are capable of being introduced through various events. First, a given schedule list is scanned periodically to automatically introduce prestored production runs into the system. Cold jobs are then introduced into the system by: (1) Operator requests, (2) scanning an input stream from a card reader or tape unit and detecting control cards which indicate run requests, (3) program control when a macro is given to retain a restart point or, (4) a worker program. Cold jobs associated with communication programs are maintained in the system at all times.

Cold jobs also contain the accounting information associated with processing a task. Typical information which can be provided at the completion of a job is the computer time consumed, the number of I/O operations required, the storage space consumed, the time at the start of execution and completion, a history of operator functions performed for this task, the number of output lines generated, and the time the request to run was made.

The cold job table is scanned at various times to consider introduction of a new "Hot" job into the system. The efficiency with which it does this scanning determines the overall efficiency of the system and the algorithm which performs the selection varies as emperical data is acquired. Hence, the program which introduces jobs into the system is easily replaced and various schemes may be called for, depending on current machine load and backlog. Factors which are considered are the printer load, available intermediate storage, space consumed by higher priority jobs, and current computer I/O load. The tendency is to maximize throughput within priority levels, and allow preemption of low precedence priority work by priority work of a higher precedence.

The function of the collector program previously mentioned is to insure that files required by jobs to run in or out of the system by type of device. The function required files are presently on the disk. If the required files are not on disk, collector checks to see if they are currently being transferred to disk or are on a magnetic tape. If the file cannot be found in the system, a message is printed to the operator requesting that the required files be mounted. Prior to having asked the operator that a tap file be mounted, collector checks a table consisting of a sorted list of all known files to verify the legitimacy of the request and avoid operator confusion. If the file is not known to the system, the job is purged and appropriate information provided by an operator message. Facilities are provided to update the file table on operator request and as new files are created within the system. Collector checks the peripheral requirements of the job and obtains items such as output tapes, intermediate tapes, and print/punch buffer areas on disk. A periodic list of files required is printed for the operator to provide collective description of system requirements. The operator has the facility to inform the system that a particular file is not available in which case the cold job entry can be held in abeyance or purged depending on operator action.

Input scheduling involves selecting the order in which input requirements is fed into the system. The design is based on the assumption that a backlog exists of things to be done. Load requests are given to the operator with enough advance notice so that: first, the system is not idling for lack of inputs required to run any job and second, that the system does not become saturated due to output generated. Overriding the consideration of maximization of throughput is the presence of high priority (deadline) work to be done. The variables considered before requesting a job's input to be loaded are: (1) its priority, (2) the amount of available disk storage, (3) the amount of disk storage this job requires, (4) the backlog of output (printed) to be done, (5) the amount of output this job is expected to generate, (6) the backlog of computation work in the system, (7) the amount of system required for this job, (8) the availability of intermediate tapes this job requires, (9) the earliest time at which this job can be run, etc.

The scheduling of peripheral devices is next discussed. A description of the status of each device attached to the computer is maintained in tables at all times together with a description of the data which is expected to flow in or out of the system by type of device. The function of the peripheral scheduler is to maintain as efficient a flow of data as possible under the general guidelines of priority of the data.

Since any job must have its input requirements available before it is activated, the input scheduler is a major element of job scheduling. Once a job has its input available, it becomes a candidate for running. At that time, the cold job scheduler is able to deal more precisely in selecting a candidate to introduce into the hot job table to maintain as much activity as possible for all elements of the system.

A factor considered by the I/O scheduling program was simplicity of operator action. Directions were presented to the operator so that the bulk of his action was uniform for all types of jobs, and information or acknowledgments necessary was minimal.

Output scheduling is somewhat dissimilar to input scheduling in that the information is in the system and must be removed as quickly as possible to provide space for more processing. In this area, if there is infromation to be transmitted to a device, it is initiated immediately on a first in/first out basis by priority class rule. Printed information is also put on tape for later reprinting if desired. In the event the printer output queue becomes execessively long, the data is diverted to a backup tape for later reintroduction into the system for printing. An identification block is written on all output tapes, the identification is retained in the reel number table, and the information is printed so that the operator can attach the ID to the reel when it is to be removed.

Scheduling of hot job tables is accomplished by the ESP 12–34. Hot job table entries contain the state of control registers of a program at the time it was last suspended along with such items as job status, running time, and priority. The hot job table is the set of paths of control for the computer to execute. These are ordered by priority and if a computer is looking for something to do, it selects and runs the entry of highest priority having ready status and re-initiates execution of the program associated with that entry.

These entries are introduced by the cold job scheduling program (which has a hot job entry at all times) or by programs which call for a BRANCH or FORK. Other hot job entries remain in the system at all times, such as the Responder program which introduces cold job entries after decoding run requests and peripheral disk programs which shall collect and file data on an automatic basis.

Hot job entries are removed if terminated 12—12 or pre-empted. Normal termination sets the cold job status to processing complete, so that on delivery of output the cold job entry can be removed. Termination due to program error (write out of bounds, illegal instruction, stack overflow) triggers a terminal dump procedure which provides the values of specified symbolic variables along with an indication of where the error occurred. If restart dump was made, it is so indicated to the operator as part of the job's output, modified files are restored to their original state if possible and normal termination is initiated. Certain ESP detected errors such as exceeded estimated run time, unknown item demanded, program exceeded core or disk space which was provided, causes similar termination. However, if a job is pre-empted, it reverts to its original cold job state or restart point and later is reintroduced automatically. If a job requests an item which is currently locked out, the job is pre-empted.

Types of status that are in the hot job table are ready to run, running on another computer, waiting an event (I/O completion or bit setting), and being terminated. Priority may be modified by the external scheduling program, by operator request, or dynamically during execution.

The formats of the system directory will now be described. There are three basic types of data files in the system: program, sequential data, and random data structures. Three types of directories are associated with these files.

Sequential data files are used by the I/O programs to present data to programs and to buffer ouput from the system. These files contain information whose source is tape or cards and whose destination is tape or a printer. The directory for this type of file is rather simple and maintained by the I/O routings. It contains the owner, block size, number of words or blocks, and format. Access to these files is on a sequential basis only.

Program files contain the outputs of compilations combined by function or groups of originators. The output of the compilers contain programs in executable form, descriptions of PRT, BXR, and BDR areas, a symbolic description of the program which is used in error dumps, and information that is to be used by the scheduling program such as the number and type of externally required objects (procedures, inputs, outputs). Item names within a compilation are generated by the compilers and item formats are fixed format. Data objects or arrays declared at compile time are also maintained in this file.

The random data structures are more complex than either of the others, and reflect the dynamic state of an item. Flexibility is given to the file designer for naming and sub-naming items, and the facility for restoring these files to a previous state is provided automatically. Lockout of file use is provided on an item basis.

Although the information content and format of these directories vary somewhat, enough similarly is maintained to allow common sub-routines to maintain portions of items in directories where practical.

Certain files have restricted access. Requests for access to these files causes three actions:
 (1) Before the fact authorization.
 (2) Record of usage.
 (3) Output to specific devices only.

Responsive to ESP scheduling 12–34 is memory allocation 12–16. The memory allocation program is responsible for the maintenance of all main memories. Its basic functions includes obtaining a block of available space to satisfy a request for space and to assume responsibility for space being relinquished by its prior owner. Allocation performs its function through the mechanism of linked tables which include all blocks of memory. All blocks of memory, whether available or assigned, are linked by address in a memory map.

All blocks of memory which are available are linked by size in an available space map. An attempt to allocate space for a caller is governed by the priority and class of the caller and the amount of space which has previously been committed to callers of that class.

The allocation routine will first try to allocate by scanning the available space map to find the smallest block which is large enough. If a block of sufficient size cannot be found, the overlay program 12–30 is called.

The function of the overlay program is to find a currently committed block of memory which can be reassigned to the caller of Allocation. Using the priority and class of the requestor, the overlay program scans the Memory Map for a block of memory to be reassigned.

If a program segment is chosen, the appropriate program reference tables (PRT) will be updated 12–20 to cause interrupt on access by the callers of the segment. If a data segment is chosen, the data segment is saved in bulk storage 12–26 before the space is reassigned. User PRT blocks and stored register values shall be updated as appropriate.

In the event that a request for space cannot be granted by these means, a deferred space request is put into an unallocated request chain. This chain is scanned periodically to allocate the deferred request.

Disk allocation is accomplished on at least two levels. The highest level allocates rather large blocks of disks 12–24 and maintains only fixed size blocks which are available for use, which are reserved for certain functions, and for what function the others are being used. At the function level, the disk may either be packed by item or allocated in small fixed size blocks depending on the type of usage. Input and output stream blocks need only retain the address of the last item recorded and retrieved 12–22 in order to obtain or record sequential type information. Files which have items of varying size which are continually being modified can more efficiently be realocated if fixed size blocks are used.

At the user level 12–34, the program does not request space from the system allocator 12–16, but by a procedure call to a routine which allocates space of the required type. These procedures make calls on the system allocator 12–16 as required and maintain their own block links. This allows a flexible allocation system which can be easily modified if usage dictates a more complex scheme and emperical modification of major or minor block size may demonstrate more effective use of capacity.

Control operations are accomplished by the interruption of processing 12–10. There is an interrupt location for each computer executing a user program and an interrupt location for computers executing ESP. The bulk of ESP is executed in normal mode with the mask set to allow I/O operations and most (I/O complete) interrupts suppressed.

On assuming control at the interrupt, the bounds are loaded, the interrupt returns information and base registers are saved, the ESP registers are then initiated, and the appropriate interrupt processing routine is given control.

Efforts were made to minimize interrupts in that I/O complete operations are given to the processor only if the processor indicated it desires it. Multiple interrupts or interrupts which occur while processing an interrupt are handled without dummy returns to the user, and grossly timed functions are processed when convenient instead of being triggered by an interrupt.

A number of error packages are included with the system. They provide an automatic mechanism for aiding in the debugging of programs at the symbolic level. The provisions for initial debugging packages is a compiler related function.

All compilers, as part of their normal output, produce a symbol table which has been formatted to the common specification of the Error package. This symbol table is filed along with the object code by the compilers. It is carried with object program files that are being prepared for execution from the disk. The symbol table is brought into main memory only in the event that a program error has been detected in the course of running the object program.

The symbol table is organized by logical segment (PRT, Program Segment, Data Segment, Global area, and BXR) and by address within the particular segment. Each entry describes the address by type (label, array, simple variable, etc.), mode (integer, floating, double, alphabetic, logical, etc.) and symbolic identifier.

Using both the current structure of the job which committed the error and the symbol table, the error program provides symbolic debugging information. Included in its output is relevant information obtained from the Hot and Cold Job tables, whatever output the program generated prior to the error, a symbolic listing of the current program nesting by program name and most recently passed label, and symbolic listing of all variables with the contents apropriately formatted including the reason for rejection by the ESP.

To free the space committed to the defunct job for productive purposes, the segments containing information to be dumped is written to the disk (PRT's, BDR-BXR, Data Segments) to be digested at a more convenient time.

The I/O routines are divided into two classes. The first class consists of routines which perform media transfer without edit or conversion. Included in this class are routines to transfer card images to magnetic tape, read a standard format record and print it, read card images to disk, write line images from disk to printer, etc. Routines of this nature are basic to the operation of the system and are supplied. These programs are I/O Module programs 12–100 which are used and controlled by the ESP.

The second class consists of programs which perform media transfers, but require editing, conversion, and formatting. These transfers are performed using a combination of the first class and Input/Output programs at the worker and/or system level. Using compiler generated calls in output/input routines, the worker program is capable of establishing a link to the I/O Module programs to perform functions such as read a record, read a card, etc. The editing, conversion, and transfer from one media to another is then controlled at the worker level. These routines adhere to present USS data conversion routines (ROULETTE and CONVERT) and are implemented without effect on the basic structure of the operating system.

Buffering is divided into two areas. The first area is that of buffering I/O devices such as card readers, tapes and printers to and from the disk 12–24, and the second is buffering the user programs I/O with the disk 12–32.

The first class of buffering is governed by individual device characteristics pertinent to the particular transaction. Included in the consideration for each device pair are relative speed of devices, minimum transfer requirements for each device, priority in I/O Module service and editing required during transfer. This class of buffering operation initially is set up by the Central Processor (I/O program, allocate disk space, allocate memory buffer space) and then carried out independently by the I/O Module 12–100. The I/O Module responds with result and interrupt information upon detecting control cards, errors, I/O completions, which are further processed by the Central Processor.

The second class of buffering is concerned with both delivering accumulated input (cards, tape) to a user program and accumulating user output (printer, punch) on the disk to be output at a convenient time.

Output buffering and input buffering are handled differently. Output buffering is motivated by the desire to remove generated output as fast as possible to free the space for other purposes. Input buffering is governed by the rate at which a user can consume input. All input-output buffer files are logged in a directory for use by the I/O and buffering routines.

A double buffering scheme is used to perform the input buffering function. The size of the input buffers is dependent on the particular device. The Input Buffering routine receives requests for input from the input routines which signal the completion of use of buffers and governs the rate at which new input buffer areas are obtained. The Input Routine is capable of obtaining sub-blocks of data from the input buffer areas consistent with the particular callers formatting requirements. These requirements determine whether the sub-block (card, record) is used in place (within the input buffer area itself) or copied to a separate area for formatting and presentation to the user.

Output buffering is accomplished by the output program assuming responsibility for generated output as it is released by user programs. The output routine is then appended by the output to the appropriate output file.

Reports on the current status of programs in execution and in the job queue are available. An "index" for each system and worked program is maintained which contains the job name, program author, date of latest correction, author of last correction, frequency of use, priority code, associated data files by name, equipment list required for execution, program chain key, size, and time estimate.

Figure 13:
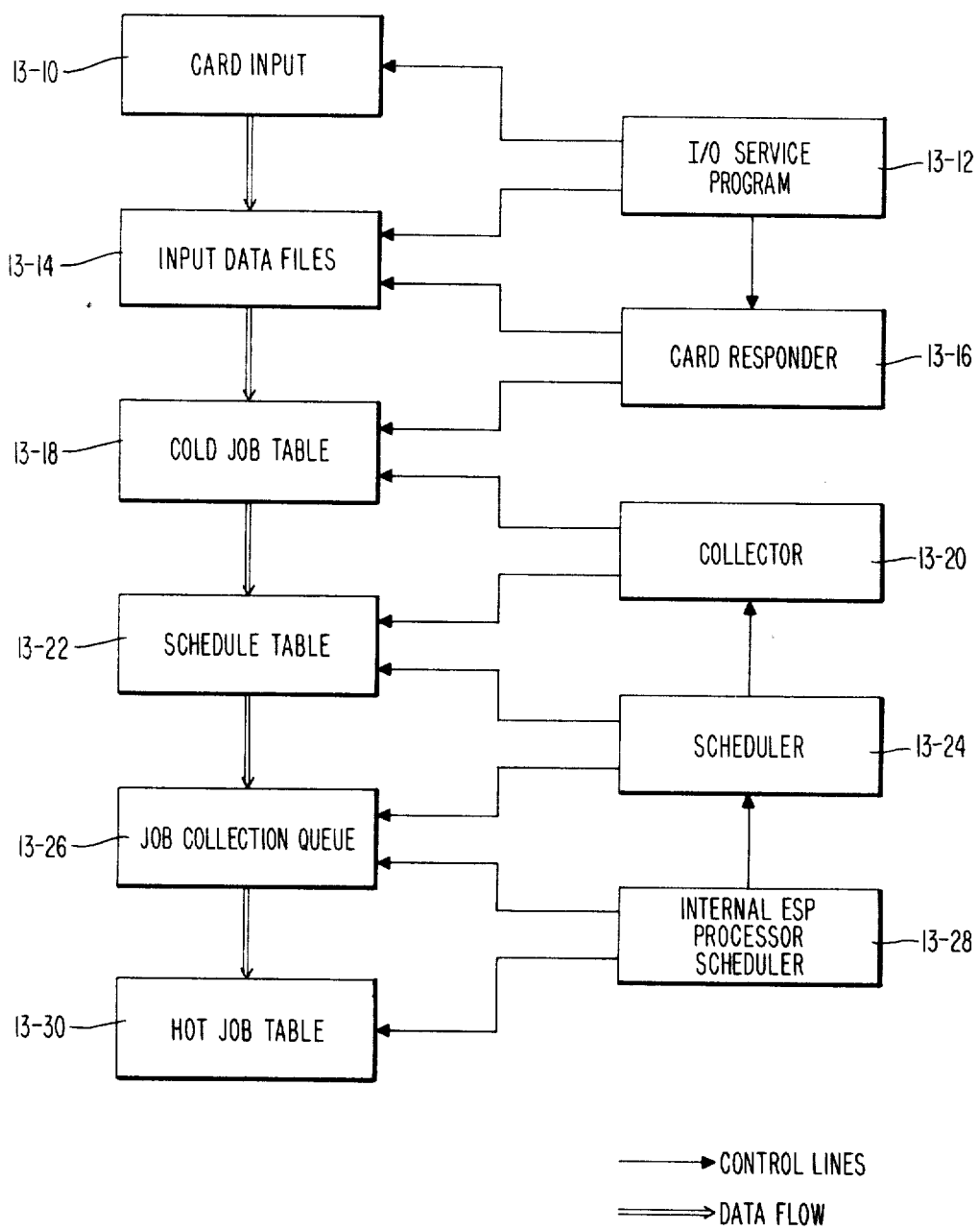
FIGURE 13 is a block diagram illustrating the flow of information (Job Flow) during an input-output operation.

FIGURE 13 refers to an I/O processing sequence. Specifically, it refers to an I/O Service Program.

I/O processing in most modern systems has been reserved as a function to be deeply imbedded in the heart of the executive system. Access to any I/O device has been begrudgingly granted by executives to users and systems programs alike only after much cross talk and run time program checks. The design of the present I/O Module discourages any approach akin to a totally centralized I/O clearing house which will handle any and all I/O requests. Agreements favoring the use of a centralized I/O control usually take the form of questions, such as:

What if more than one program tries to use the same printer?

What if two programs alternately read small consecutive pieces of data from mutually remote areas of the same tape?

Close consideration of these questions, however, indicates that they are not actually arguments for having all I/O handled by a single processing agency, but rather, or having all I/O of similar type handled by the same agency. This distinction is very important and is one of the major influencing factors in the design of the I/O processing facilities in the system software.

The I/O Control Module used herein, can be thought of as 512 individual processors which time-share common logic and a common memory. Each processor has the capability of executing an I/O Module program which has been supplied to it in the form of descriptors. Each of these programs is related to a particular processor which, in turn, is actually an I/O channel. The program for a particular channel is dependent both on the type of device and the format of the data to be input/output on that channel. Although it is possible for one centralized I/O processing agency to handle all these functions in a generalized fashion, the penalties paid by the remaining functions for the purposes of this generality are unreasonable. In addition, it is not in keeping with modular philosophy to expect one centralized program to handle all input/output for all of the 512 channels in a generalized fashion. In fact, to do it in this manner would defeat the purpose of modularity.

The I/O processing functions in the present programming system will be distributed among several programs, each of which will handle a single type of channel on the basis of the characteristics of that particular type of channel. The program that performs the functions of one type is a part of ESP. The programs that perform the functions of the remaining types are service routines which have the form of user programs. They have one characteristic, however, which distinguishes them from user programs, namely, the ability to communicate directly and exclusively with certain I/O channels.

Each I/O service program has the ability to use ESP controlled peripheral devices as is dictated for the particular services it must perform. The I/O service programs are called by both user programs and other systems programs. The I/O data is consistent in format when it reaches either the service program on output or is received from the service program on input so the user and systems programs can work on data without regard for source or destination.

The ESP contains a table identified as the channel assignment table. Each I/O channel is classified according to type of channel and is associated with an appropriate I/O service program. Every interrupt from the I/O Module will be passed through the channel assignment table to the associated I/O service program.

All service programs, though designed to handle specific types of I/O, are of the same general structure from an overall systems viewpoint. Each I/O service program receives controlling input from other systems programs and the ESP. The systems programs supply parameters and/or data to be output/input, and the ESP supplies controlling information via the channel assignment table and I/O Module interrupts. The characteristics of an I/O service program will now be described as a model after which all service programs are tailored.

A linked list I/O table contains all required information to control both input and output operations over all such channels. The organization of this table is significant, in that various organizations provide certain advantages. For example, if the table is organized by stations certain definite advantages are provided where line printers are considered, since all line printer output for a given job will appear on one of the line printers. The service program will distribute the various complete printed outputs from completed jobs to as many printers as are available at a particular station.

More specifically, the table will contain information defining the type of device, number of devices of this type, link lists of all output for a given printer or punch, disk addresses of all output for a given job, indication as to the state of completion of any particular job which has output unsent, indication as to the state of all outputs in process from disk to printer and disk to card punch, and other pieces of information required to effectively control these I/O operations.

When a compiled program does provide an output, the compilers have inserted a call to an output procedure. The output call has specified that the output be printed or punched in some desired format. The I/O procedure formats the output for the selected device. An identification, denoted STATION-JOB control information, has been passed on by ESP control functions to the I/O procedure. All user output signals are tagged with this identification which relates all output with the source of the job request. This relationship is automatically established for every job. The destination of output is changeable by the use of appropriate control cards. On the basis of this information, the I/O procedure selects the particular service program and passes the output to that program.

This service program does any character conversion and special additional formatting required for the output. A block of output words are written on the disk and an appropriate entry is made in the corresponding I/O control table. All print/punch output for any given job is collected on the disk. When a job which originated from such a terminal is terminated or suspended due to program error or normal completion, the Termination or Suspend program informs the appropriate service program of this fact. The user's output can now be transmitted. When a device of the required type is available at the proper terminal, an I/O Module program is initiated to transfer the information from the disk to the remote peripheral.

If the output information from a single job is on different blocks of the disk, interrupt signals from the I/O Module at the completion of each block will be passed back via the channel assignment table. If the transfer output information is not completed, the next block will be transmitted; otherwise the output information from a new job will be sought.

Returning to FIGURE 13, the input signals to these terminals are completely controlled by I/O Module interrupt signals placed on selected control input cards 13–10. An input channel is initially primed with an I/O Module program which interrupts on first receipt of data. At this interrupt, the I/O service program 13–12 allocates disk space and a memory buffer for the incoming cards 13–10. A new I/O Module program which recognizes all control cards, packing them on the disk with their associated disk address, is initiated. The I/O program 13–12 interrupts only when it detects a JOB or an END JOB cards. A JOB card causes the service program to update its tables contained in the input data files 13–14 and initiate an I/O Module program to read the cards and transfer them to the disk. When an END JOB card is encountered, the source input has been transmitted to the disk and is preceded by a table containing a copy of all control cards and their disk address in the source deck.

A program called card responder 13–16 is now activated by the program 13–12 and the address and size of the control card block are given to it as parameters. The input cards can now be processed by card responder 13–16 and the job can be set up for collection, scheduling and execution.

The card responder 13–16 is activated by the service program upon recognition of an END JOB control card, and is given as an input parameter the starting disk address of the job card deck. A job card deck may consist of various program executions, programs to be compiled, data files, and control information. This information is scanned by Card Responder 13–16 and placed in proper format in the Cold Job Table 13–18. The Cold Job Table entry for each job deck is stored on the disk and is used for accounting, output control, and program scheduling. Card responder 13–16 interrogates the syntax of each control card to ensure that the job card deck contains all information necessary for program execution and will indicate to the requesting station any job which is in error.

Whenever a processor is being executed in its normal mode of operation, there must have been a Hot Job Table 13–30 corresponding to the path of control which it is following. A path of control is normally suspended because it requests an ESP service that cannot be completed immediately, and the processor's registers are saved in the Hot Job Table (HJT) 13–30 for later resumption of computation along that path. When a processor is operative in the ESP mode and looking for useful work, it consults the HJT 13–30 which has highest priority, to see if it is ready to be executed. If this HJT is in a state which prohibits it from being executed (awaiting I/O, awaiting bit, etc.), the ESP continues on to the next highest priority job in the HJT chain. When this internal ESP processor scheduler 13–28 determines that it is not keeping the processor occupied with useful work, and there is a reasonable amount of available memory, it consults the job collection queue 13–26 for the next available program to be entered into the system. The program is selected on the basis of its priority and memory requirement. That is, the highest priority job requiring the least amount of memory is scheduled and all other jobs remaining are increased in priority. When the job collection queue 13–26 has reached the nearly-empty threshold, the ESP activates the scheduling program 13–24 whose function it is to search the schedule table 13-22 and enter into the job collection queue 13–26 the next appropriate set of programs to be processed.

An efficient scheduling algorithm must be responsive to dynamic system changes, providing effective usage of the total system configuration. Individual program specifications which dictate the next appropriate job to be scheduled are generated by the programming system. These specifications consist of memory requirements, estimated processor time, input/output requirements, and job dependence. In addition, it is necessary that a base priority be assigned to allow the requesting station the ability of establishing a priority for its own workload.

The basic design of the present system organization suggests a scheduling algorithm which places importance on jobs which require the least amount of memory and the smallest estimated processor time. These two factors weigh heavily on establishing a priority for a job; therefore, it is imperative that the scheduling program upgrade the priority of all jobs represented in the schedule table on a time basis. This provides that large programs which occupy sizable processor time will not remain dormant in the schedule table while smaller programs are being scheduled.

The internal processor scheduler of the ESP 13–28 requires that all information be available to it in order to initiate and schedule a job from the Hot Job Table 13–30. Therefore, when entering a new program into the job collection queue 13–26, the scheduling program 13–24 also enters the required file directory item into the system directory for the program which is to be run.

When the scheduling table 13–22 reaches a nearly-empty state, the scheduling program 13–24 activates the collection program 13–20 to refill the scheduling table 13–22 with the next set of programs to be scheduled.

The ESP, with its very complete knowledge of the status of all programs in the system, could very easliy be extended to include several functions to monitor system performance. Thus, it would be easy to log each major action of the ESP and periodically record the major system parameters (number of programs, avaliable space, number of paths, etc.). Editors to process this log could be written to derive such useful data as the average number of control paths waiting for a computer, the frequency of slow-up caused by insufficient memory, and so on. Data provided by these logging functions could be used as a basis for both evaluating different scheduling and allocation disciplines and pin-pointing possible areas for improvement in the ESP, and also for arriving at sensible recommendations about the adequacy of a system configuration for the processing load. The FIGURE 13 then shows the flow of jobs from remote terminals to the point where they are ready to be processed.

The functions of the Collector 13–20 is to make readily available to the scheduling programs 13—24 the information necessary to adequately perform its function, and also make available to the system the programs and files necessary for execution. The Collector 13–20 scans the Cold Job Tables 13–18 for the next available program to be entered, and formats the information they contain into the description required of the schedule table 13-22. Scheduling parameters not presented in the Cold Job Table 13-18 are avaliable on the file in which the program, which is to run, is contained. If the necessary file is not available to the system, in either the system directory or the inactive file list, the Collector 13-20 must indicate to the system operator that the required file is to be presented. When the required file is presented, it is copied to the disk and its presence is noted in the inactive file list. The job description may then be incorporated with information from the Cold Job Table 13-18 to described the selected program in the schedule table 13-22.

What has been described is a modular data processing system having an extremely high operational speed and including means of exploiting this increased speed. It's operating system is unique in that it is not a monolith of instructions; rather it is a functionally segmented collection of programs which may be used as the need arises. Basically it has two major parts, the Executive and Scheduling Program (ESP) and the collection of systems programs. The ESP performs such functions as interrupt control and timing which are most closely associated with the hardware of the Computer Module. The task of greatest importance in the system is given to the ESP; i.e., arranging to execute the largest number of programs in the shortest possible time.

The use of equipment in the multiprocessing mode discourages the former type of operation in which a main program and its supporting parts were collected into a block and given control of the entire facility. The design of this system and its use disclose a mode of operation in which many more or less unrelated jobs are performed concurrently. In this operating system the ESP is given access to a large file of programs and data which it can use without manual intervention. The file is organized with both the programs and their descriptions, constraints, interrelations and requirements for automatic use by ESP. They may be located anywhere in the Memory Modules and executed by any Computer or I/O Module under ESP direction.

Memory protection is provided through ESP for all program segments by a set of base registers, bounds registers and program reference table entries. These registers may be changed only under control of the ESP. The base register are pointers for the areas in the Memory Modules that are assigned to the stack extension, the index registers and the variable data. The values in these registers are used in relative addressing calculations for both fetching and storing.

Two sets of memory bounds registers are provided: the primary set and the alternative set. The primary or regular registers are set by ESP and are used unless otherwise specified. Normally, write operations are automatically checked against these memory bounds. The alternative memory bounds registers are loaded with values taken from the program reference table (PRT) at the occurrence of tagged fetch operations. Their memory usage relative to the program reference table is checked against the alternative bounds registers rather than the regular bounds registers. Changing of the program reference table, but not use of it to change the alternative bounds registers, is an ESP function. The use of two sets of bounds allows full protection of a large block of memory, such as a compiler, as well as the concurrent protection of many small areas both of which are required in a multiprocessing-multiprogramming-multi-accessing operation.

Although there has been shown and described only certain specific computer operations and interconnections, it will be apparent that many more operations and interconnections are possible without departing from the spirit of the present invention. Therefore this invention is not to be limited except insofar as is indicated by the purview of the disclosure itself.

What is claimed is:

1. A multicomputing modular data processing system comprising:
    (a) a plurality of main memory modules connected together to provide a multiaccessible main memory;
    (b) a plurality of central processing modules connected to the multiaccessible main memory for simultaneous access thereto;
    (c) at least one input/output control module correspondingly connected to the multiaccessible main memory;
    (d) each of said central processing modules and said input/output control module further comprising a plurality of substantially independent operating stations interconnected within each module to sequentially receive, temporarily store and concurrently execute the sequential steps of a program being processed.

2. The multicomputing modular data processing system as set forth in claim 1 wherein each of said main memory modules, each of said central processing modules and said input/output control modules include a communication station capable of bidirectional intermodular communication between said memory modules and the remaining modules, which intermodular communication is substantially independent of the intramodular operation of the communicating module.

3. A multicomputing modular data processing system as set forth in claim 2 wherein each of said central processing modules also includes an advance, and a final station both of which are connected to each other and to the communication station therein for intramodular communication therebetween.

4. A multicomputing modular data processing system as set forth in claim 3 wherein the advance station, the final station and the communication station each include temporary storage means to provide the necessary buffering required for substantially independent station operation within each central processing module.

5. The multicomputing modular data processing system as set forth in claim 2 wherein said input/output control module is further comprised of an input/output processing station, a data service station, and a local memory station, said input/output processing station and said data service station both connected to said local memory station and both connected to the communication station for separate independent and bidirectional communication therebetween.

6. The multicomputing modular data processing system as set forth in claim 5 wherein said input/output processing station also includes means for independent bidirectional communication with the central processing modules of the system and said data service unit includes a similar means for separate bidirectional communication with the peripheral control devices of the system.

7. A multicomputing modular data processing system comprising:
    (a) a thin-film main memory including a plurality of identical memory modules to simultaneously provide a plurality of separate access means to the main memory;
    (b) a central processor including a plurality of identical central processing modules individually connected to all of said memeory modules for selective access to each;
    (c) a plurality of input/output control modules correspondingly connected to all of said memory modules;
    (d) each of the processing, control and memory modules further comprising a plurality of functional operating station units interconnected with each of said modules to provide substantially independent intramodular means for concurrently processing a plurality of sequentially received program steps.

8. The multicomputing modular data processing system as set forth in claim 7, where in the plurality of functional operating station units in each of the processing, control and memory modules includes a bidirectional main memory communication station having interchangeably compatible input receiving and interchangeable compatible output driving means to provide between the main memory modules and the other functional modules of the data processing system a memory communication subsystem whose operation is substantially independent of concurrent processing operations occurring in the remaining functional operating stations in each of the modules.

9. A multicomputing modular data processing system comprising:
  (a) a plurality of N indentical thin-film memory modules;
  (b) two or more identical central processing modules;
  (c) one or more identical input/output control modules;
  (d) each of said memory modules including a bidirectional communication station having $n$ input receiving connections and $n$ output driving connections;
  (e) the $n$ input receiving connections and the $n$ output driving connections from each memory module correspondingly connected together to form a common group of N main memory input connections and a corresponding group of N main memory output connections;
  (f) each of said central processing modules and each of said control modules including a bidirectional communication station having an individual input receiving connection and an individual output driving connection;
  (g) said individual input receiving connection on each central processing module and on each input/output control module separately connected to any one of the common group N memory output connections; and
  (h) said individual output drive connections on each central processing module and each input/output control modules separately connected to its alternate in the corresponding group of N main memory input connections to thereby provide a system wherein any input/output connection to main memory may be utilized interchangeably by a central processing module or an input/output control module.

10. The multicomputing modular data processing system as set forth in claim 9 wherein the plurality of N identical thin-film memory modules comprise sixteen memory modules each having a communication station with sixteen bidirectional memory communication busses and said central processing and control modules combined comprise a mixture of sixteen modules, each of which is respectively connected through their individual communication stations to one of the sixteen bidirectional memory communication busses.

11. A multicomputing modular data processing system comprising:
  (a) a plurality of identical main memory modules each having a memory stack therein;
  (b) a plurality of identical central processor modules individually coupled to all of said memory modules for selective connection to each;
  (c) one or more identical input/output control modules correspondingly connected to all of said memory modules;
  (d) operating syste mcontrol means included in each of said main memeory module and connected to said memory stack to receive and organize any job stored in said stack into a plurality of data sets and program objects to thereby provide a modular data processing system having a modular operational system.

12. A data processing system as set forth in claim 11, wherein said system operating control means comprises a first means for storing an executive and control program, a second means for storing a plurality of systems programs and including therein a third means for storing a plurality of service programs, each of said second and third storage means being connected to for direct communication with, said executive and control programs stored in said first means.

13. A multicomputing modular data processing system as set forth in claim 11, wherein said operating system control means is selectively coupled to each of said processing modules and each of control modules and includes a plurality of means for storing system control procedures (stored) in each of said main memory modules, said operating system control means including further means for organizing any job into a plurality of data sets and program objects which do not need to be in main memory at the same time to thereby permit jobs to be executed with substantially less storage capacity than is usually required.

14. A multicomputing modular data processing system as set forth in claim 11, wherein the operating system control means includes a plurality of storage means for housing small modular segments of each program and only the portion of said plurality of storage means housing segments which are active at a given time being included in the main memory configuration during the execution time of a program thereby eliminating the continuous need for large contiguous main memory areas for the entire execution period of the program.

15. A multicomputing modular data processing system as set forth in claim 14, wherein the plurality of means for storing small modular segments of all programs are interconnected in a uniform manner to create a standard storage structure for all of said programs.

16. A memory organization for a data processing system comprising:
  (a) a plurality of identical main memory modules;
  (b) each of said memory modules having a plural word per line organized magnetic thin film memory stack;
  (c) a read/write control means connected to said memory to select the line location and define the operation to be performed;
  (d) a plural word register connected to the memory stack to receive all words stored in the selected line location;
  (e) a word selection means to indicate and activate for transfer the selected word of the plurality which is desired; and
  (f) a single word output means to provide the desired word to thereby provide a memory system capable of satisfying multiple or singular word read/write requests.

17. A multicomputing modular data processor comprising:
  (a) a plurality of identical main memory modules;
  (b) each of said memory modules having a plural word per line organized (by a plural word) magnetic thin-film memory stack;
  (c) a read/write control means connected to said memory to select the line location and define the operation to be performed;
  (d) a plural word register connected to the memory stack;
  (e) a word selection means to indicate the selected word of the plurality which is desired;
  (f) a single word output means to supply the desired word;
  (g) a plurality of identical processing modules; and
  (h) at least one input/output control module all commonly coupled to each of said memory modules to selectively receive the supplied word.

18. A multicomputing modular data processor as set forth in claim 17, wherein the common coupling of the processing and control modules to the memory modules comprises a plurality of parallel lines sufficient to simultaneously transfer a system word.

19. A multicomputing modular data processing system comprising:
  (a) a plurality of identical main memory modules each having a plural word per line organized memory stack and a plural word line selection means;
  (b) a plurality of identical central processor modules individually coupled to all of said memory modules with means for selective connection to each memory module, to each memory line within the module and to each memory word stored on the lines;
  (c) one or more identical input/output control modules correspondingly connected with means for selective connection to each of said memory modules to provide single and plural word capabilities where a plurality of contiguous memory words may be accessed in less time than that required when each word is individually accessed.

20. A multicomputing modular data processing system as set forth in claim 19 wherein each memory module also includes means for transferring each successive word of a plurality in successive clock times.

21. The multicomputing modular data processing system as set forth in claim 19 wherein each of said memory modules includes a plural word register having a word length capacity corresponding to the plural word length of each line of the memory stack, said word register connected to the output of said memory stack to receive each information transfer from said stack.

22. The multicomputing modular data processing system, as set forth in claim 21, wherein a line/word selection means is connected to said plural word register to select any individual word in the plural word register for transfer out of said module.

23. The multicomputing modular data processing system as set forth in claim 22, wherein the memory stack in each of said memory modules is a magnetic thin-film storage device having non-destructive readout characteristics.

24. The multicomputing modular data processing system as set forth in claim 23, wherein each memory stack has included therewith a regenerative rewrite means connected to the stack to receive each output signal transferred therefrom and further connected to rewrite the received information into the memory stack at the same location.

References Cited

UNITED STATES PATENTS

| | | | |
|---|---|---|---|
| 3,200,380 | 8/1965 | MacDonald et al. | 340—172.5 |
| 3,226,688 | 12/1965 | Amdahl et al. | 340—172.5 |
| 3,274,554 | 9/1966 | Hopper et al. | 340—172.5 |
| 3,274,561 | 9/1966 | Hallman et al. | 340—172.5 |
| 3,302,182 | 1/1967 | Lynch et al. | 340—172.5 |

PAUL J. HENON, *Primary Examiner.*

RAULFE B. ZACHE, *Assistant Examiner.*

UNITED STATES PATENT OFFICE
CERTIFICATE OF CORRECTION

Patent No. 3,411,139                                  November 12, 1968

John T. Lynch et al.

It is certified that error appears in the above identified patent and that said Letters Patent are hereby corrected as shown below:

Column 4, line 70, "is, second occurrence, should read -- in --. Column 16, line 3, "JSA←JSA+2" should read -- JSA←JSA+1 --. Column 17, line 28, "program" should read -- programs --; line 73, "it" should read -- its --. Column 20, lines 72 and 73, "in or out of the system by type of device. The function required files are presently on the disk." should read -- are made available. The collector checks to see if the required files are presently on the disk. --. Column 21, line 4, "tap" should read -- tape --. Column 22, line 51, "routings" should read -- routines --. Column 31, line 38, "drive" should read -- driving --. Column 32, line 56, cancel "(by a plural word)".

Signed and sealed this 10th day of March 1970.

(SEAL)
Attest:

EDWARD M. FLETCHER, JR.                          WILLIAM E. SCHUYLER, JR.
Attesting Officer                                      Commissioner of Patents